US012556434B2

(12) United States Patent
He et al.

(10) Patent No.: US 12,556,434 B2
(45) Date of Patent: Feb. 17, 2026

(54) UPLINK SOUNDING REFERENCE SIGNAL (SRS) TRANSMISSION IN CARRIER AGGREGATION SYSTEM

(71) Applicant: Apple Inc., Cupertino, CA (US)

(72) Inventors: Hong He, Sunnyvale, CA (US); Gang Xiong, Portland, OR (US); Seunghee Han, San Jose, CA (US); Hwan-Joon Kwon, Portland, OR (US); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 595 days.

(21) Appl. No.: 17/502,608

(22) Filed: Oct. 15, 2021

(65) Prior Publication Data

US 2022/0109590 A1 Apr. 7, 2022

Related U.S. Application Data

(63) Continuation of application No. 16/303,759, filed as application No. PCT/US2017/038536 on Jun. 21, 2017, now Pat. No. 11,153,126.

(Continued)

(51) Int. Cl.

*H04L 25/02* (2006.01)
*H04L 1/1812* (2023.01)

(Continued)

(52) U.S. Cl.

CPC ........ *H04L 25/0226* (2013.01); *H04L 1/1819* (2013.01); *H04L 5/0051* (2013.01);

(Continued)

(58) Field of Classification Search

CPC . H04L 25/0226; H04L 1/1819; H04L 5/0051; H04L 5/0055; H04L 5/1469;

(Continued)

(56) References Cited

U.S. PATENT DOCUMENTS 11,159,289 B2 * 10/2021 Rico Alvarino .. H04W 72/0446
2011/0310830 A1 * 12/2011 Wu .................... H04L 27/2601 370/329

(Continued)

FOREIGN PATENT DOCUMENTS

CN 103220070 A 7/2013
CN 103460619 A 12/2013

(Continued)

OTHER PUBLICATIONS

3GPP TS36.213 V14.2 (Mar. 2017); Evolved Universal Terrestrial Radio Access (E-UTRA); Physical layer procedures, Release 14 (Year: 2017).*

(Continued)

*Primary Examiner* — Jutai Kao
(74) *Attorney, Agent, or Firm* — Eschweiler & Potashnik, LLC; Ningjiao Zhang

(57) ABSTRACT

An apparatus can receive or transmit parameters for a sounding reference signal (SRS) transmission configuration as an uplink (UL)/downlink (DL) configuration of a serving cell. A time division duplex (TDD) operation with a plurality of component carriers (CCs) can be enabled/generated based on the parameters and at least one component carriers being reserved for the UL transmission or having a higher priority than a physical channel transmission such as a physical uplink shared channel (PUSCH) transmission or a physical uplink control channel (PUCCH) transmission.

18 Claims, 10 Drawing Sheets

Related U.S. Application Data

(60) Provisional application No. 62/353,375, filed on Jun. 22, 2016.

(51) Int. Cl.

| | |
|---|---|
| ***H04L 5/00*** | (2006.01) |
| ***H04L 5/14*** | (2006.01) |
| ***H04L 27/26*** | (2006.01) |
| ***H04W 4/06*** | (2009.01) |
| ***H04W 72/0446*** | (2023.01) |
| ***H04W 72/23*** | (2023.01) |
| ***H04W 72/566*** | (2023.01) |
| ***H04W 76/27*** | (2018.01) |

(52) U.S. Cl.

CPC .......... *H04L 5/0055* (2013.01); *H04L 5/1469* (2013.01); *H04L 27/2607* (2013.01); *H04W 4/06* (2013.01); *H04W 72/0446* (2013.01); *H04W 72/23* (2023.01); *H04W 72/569* (2023.01); *H04W 76/27* (2018.02); *H04L 5/001* (2013.01)

(58) Field of Classification Search

CPC ...... H04L 27/2607; H04L 5/001; H04W 4/06; H04W 72/0446; H04W 76/27

See application file for complete search history.

(56) References Cited

U.S. PATENT DOCUMENTS

| | | | | |
|---|---|---|---|---|
| 2013/0010659 | A1 | 1/2013 | Chen et al. | |
| 2013/0242911 | A1* | 9/2013 | Heo | H04W 52/367 370/329 |
| 2014/0105130 | A1 | 4/2014 | Noh | |
| 2014/0146697 | A1 | 5/2014 | Kim | |
| 2014/0376471 | A1 | 12/2014 | Nishio et al. | |
| 2015/0003351 | A1* | 1/2015 | Park | H04J 1/02 370/329 |
| 2015/0372792 | A1 | 12/2015 | Damnjanovic et al. | |
| 2016/0254892 | A1* | 9/2016 | Kim | H04L 5/0051 370/280 |
| 2017/0244526 | A1 | 8/2017 | Kim et al. | |
| 2017/0290040 | A1 | 10/2017 | Dinan | |
| 2017/0302419 | A1 | 10/2017 | Liu | |
| 2017/0324528 | A1 | 11/2017 | Rico Ivarino et al. | |
| 2017/0332365 | A1* | 11/2017 | Lin | H04W 72/20 |
| 2019/0109675 | A1* | 4/2019 | Chen | H04W 56/0015 |
| 2019/0159195 | A1 | 5/2019 | Hwang et al. | |
| 2019/0165908 | A1 | 5/2019 | Takeda | |

FOREIGN PATENT DOCUMENTS

| | | | |
|---|---|---|---|
| CN | 104012017 | A | 8/2014 |
| WO | 2011100466 | A3 | 8/2011 |
| WO | 2011123805 | A1 | 10/2011 |
| WO | 2011161616 | A1 | 12/2011 |
| WO | 2012036704 | A1 | 3/2012 |
| WO | 2013112320 | A1 | 8/2013 |

OTHER PUBLICATIONS

3GPP TS 36.213 V12.9.1 (Mar. 2016); Release 12; sections 1-9.

3rd Generation Partnership Project; Technical Specification Group Radio Access Network; Evolved Universal Terrestrial Radio Access (E-UTRA); Physical channels and modulation (Release 13); 3GPP TS 36.211 V13.1.0 (Mar. 2016).

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); 3GPP TS 36.300 V13.3.0 (Mar. 2016).

3rd Generation Partnership Project; Technical Specification Group Radio Access Network; Evolved Universal Terrestrial Radio Access (E-UTRA); Radio Resource Control (RRC); Protocol specification (Release 13); 3GPP TS 36.331 V13.1.0 (Mar. 2016).

International Search Report and Written Opinion dated Sep. 26, 2017 for PCT Application PCT/US2017/038536.

“SRS subframe design for SRS carrier based switching.” Source: Huawei, HiSilicon. Agenda Item: 6.2.6.1. 3GPP TSG RAN WG1 Meeting #85. Nanjing, China, May 23-27, 2016. R1-164107. 4 pages.

3rd Generation Partnership Project; “Evolved Universal Terrestrial Radio Access (E-UTRA)”; Physical Layer Procedures; Release 13; 3GPP TS 36.213; Version13.0.0; Dec. 2015.

International Preliminary Report on Patentability dated Dec. 25, 2018 for PCT Application PCT/US2017/038536.

Non-Final Office Action dated Feb. 18, 2021 in connection with U.S. Appl. No. 16/303,759.

Notice of Allowance dated Jun. 16, 2021 in connection with U.S. Appl. No. 16/303,759.

ZTE; “Remaining Open issues of Simultaneous transmission of UL Channels/Signals”;3GPP TSG RAN WG1 Meeting #63bis; R1-110165; Jan. 17, 2011.

Alcatel-Lucent, Alcatel-Lucent Shanghai Bell; “Simultaneous transmission of multiple UL channels with multiple TA groups”; 3GPP TSG RAN WG1 Meeting #69; R1-122473; May 21, 2012.

* cited by examiner

UPLINK SOUNDING REFERENCE SIGNAL (SRS) TRANSMISSION IN CARRIER AGGREGATION SYSTEM

REFERENCE TO RELATED APPLICATIONS

This is a Continuation of U.S. application Ser. No. 16/303,759, filed on Nov. 21, 2018 (now U.S. Pat. No. 11,153,126, issued on Oct. 19, 2021), which is a National Phase entry application of International Patent Application No. PCT/US2017/038536, filed on Jun. 21, 2017, which claims priority to U.S. Provisional Application No. 62/353,375, filed on Jun. 22, 2016, entitled "UPLINK SOUNDING REFERENCE SIGNAL TRANSMISSION IN CARRIER AGGREGATION SYSTEM", the contents of which is herein incorporated by reference in its entirety.

FIELD

The present disclosure is in the field of sounding reference signal (SRS) communication, and more specifically, pertains to communicating the SRS in uplink transmissions with carrier aggregation.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the access node can be an Evolved Universal Terrestrial Radio Access Network (E-UTRAN) Node Bs (also commonly denoted as evolved Node Bs, enhanced Node Bs, eNodeBs, or eNBs) with or without one or more Radio Network Controllers (RNCs), which can communicate with the UE. The DL transmission can be a communication from an access point/node or base station (e.g., a macro cell device, an eNodeB, an eNB, WiFi node, or other similar network device) to the UE, and the UL transmission can be a communication from the wireless network device to the node.

In LTE networks, there are many kinds of DL heavier traffic, which leads to a greater number of aggregated downlink component carriers (CCs) than the number of (aggregated) uplink CCs. For the legacy UE categories, the typical carrier aggregation (CA) capable UEs support one or two UL CCs.

Regarding a time division duplex (TDD) CC supporting both uplink (UL) and downlink (DL), the SRS is transmitted in UL on the TDD CC as part of channel reciprocity that can be utilized by the eNB to precisely determine the DL channel condition for link adaptation. Link adaptation (or adaptive coding and modulation (ACM)) can refer to matching of the modulation, coding or other signal and protocol parameters to the conditions on a radio link (e.g., the path-loss, the interference due to signals coming from other transmitters/transceivers, the sensitivity of the receiver, the available transmitter power margin, etc.). Adaptive modulation systems can utilize channel state information, for example, at the transmitter, which can be acquired in a TDD operation by assuming that the channel from the transmitter to the receiver is approximately the same as the channel from the receiver to the transmitter.

Sounding reference signals (SRSs) can be transmitted at the UL and allow the network to estimate the quality of the channel at different frequencies. SRS is used by the base station/eNB to estimate the quality of the uplink channel for large bandwidths outside the assigned span to a specific UE. This measurement is not obtained with the DRS since these are associated to the PUSCH or PUCCH and limited to the UE allocated bandwidth. Unlike the DRS associated with the physical uplink control and shared channels, the SRS is not necessarily transmitted together with any physical channel. If the SRS is transmitted with a physical channel, then it can stretch over a larger frequency band. The information provided by the estimates can then be used to schedule UL transmissions on resource blocks of good quality.

A UE generally has the capability of aggregating larger number of DL CCs than that in the UL. As a result, some TDD CCs with DL transmission for the UE could have no UL transmission with SRS. As such, channel reciprocity may not be utilized for some DL carriers. Such situations can become more severe with CA enhancement of up to 32 CCs or more, where a large portion of CCs are TDD CCs.

DETAILED DESCRIPTION

Figure 1:
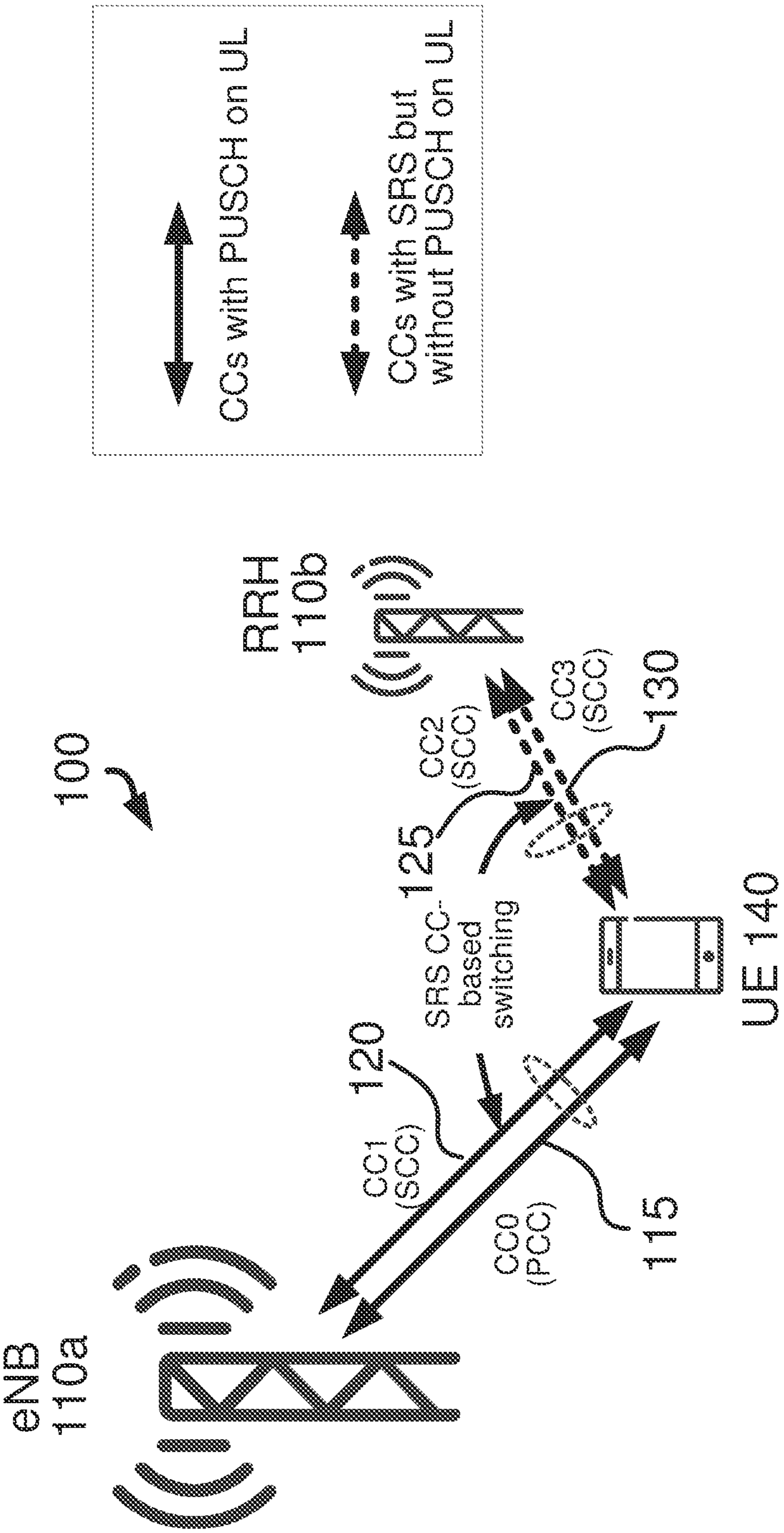
FIG. 1 illustrates a block diagram of an example wireless communications network environment for a UE or eNB according to various aspects or embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

INTRODUCTION

In consideration of described deficiencies of radio frequency communication and SRS operations, various aspects for SRS carrier based switching for LTE network devices can provide for the transmission of SRS on CCs for which UL is not configured for other UL transmissions (e.g., a physical uplink shared channel (PUSCH) transmission). This can thus enable faster link adaptation and beamforming for TDD CCs by exploiting channel reciprocity.

Hereinafter, for the purpose of explanation of various aspects/embodiments, the terminology "SRS CC" can refer to a TDD CC that is not configured with or for PUSCH transmission or other physical channel transmission (e.g., a physical uplink control channel (PUCCH) or other physical channel), but that can be configured with SRS transmission on an UL transmission. A "normal CC" can refer to a UL CC that can be configured with any UL channels (e.g. PUSCH, SRS or others) at least.

In an example aspect, transmitting SRS in a wireless communication system, can comprise receiving, by a user equipment (UE), or transmitting by an eNB, a SRS transmission configuration for transmitting the SRS on an SRS CC. The SRS transmission configuration can comprise a set of parameter for generating the SRS transmission. For example, these parameters can comprise at least one of: a first CC and a second CC, one or more dedicated-SRS (D-SRS) subframes, a starting symbol of SRS transmission in the one or more D-SRS subframes on the second CC or an SRS CC-based switching time, a periodicity, bandwidth, hopping frequency, frequency hopping pattern as a predefined pattern, subframe gap length/time, or other SRS transmission configuration (UL/DL configuration) parameters that define the configuration of a subframe/frame structure (e.g., subframe type or the like).

A period comprising a reduced number of symbols used for data communication can be identified as part of the parameters. This period can be based on the configured SRS CC-based switching time and the starting symbol of SRS transmission on the second CC, for example, which can also be part of the parameters. The UE can then transmit PUSCH or receive PDSCH according to the identified period in the one or more D-SRS subframes. The SRS can then be transmitted on the second CC (e.g., SRS CC) in the starting symbol in the D-SRS according to the received SRS transmission configuration or associated parameters.

Additionally or alternatively, the second CC can be configured to only enable SRS transmission in the UL, and thus, not enable PUSCH/PUCCH transmissions for a TDD serving cell, for example. The SRS transmission configuration can also referred to as an UL/DL configuration of a serving cell given by one or more parameters for the serving cell, in which the parameter can be any one of the parameters discussed herein, or another parameter such as a harq-ReferenceConfig-r14 or hybrid automatic repeat request (HARQ) for signaling based on a HARQ configuration/communication structure, for example. For a UE configured to operate with SRS carrier switching, if the first symbol in a subframe collides with the SRS CC-based switching time for an SRS transmission, the resource elements (REs) in a first orthogonal frequency-division multiplexing (OFDM) symbol can be counted in a PUSCH mapping, but not used for transmission of the PUSCH. These aspects can provide for improved apparatuses and methods for SRS carrier based switching to minimize collision(s) between SRS on SRS CCs and PUCCH/PUSCH on normal CCs and further ensure the triggered SRS transmission on SRS CCs. Additional details aspects/embodiments and details of the disclosure are further described below with reference to the figures.

FIG. 1 illustrates an example non-limiting wireless communications environment 100 that demonstrates a CA system 100 employing SRS CC-based switching operations. For example, the UE 140 can be configured with asymmetric DL-to-UL CC assignments for data transmissions. For example, the eNBs 110*a* or 110*b* can transmit DL information to the UE 120 over four CCs (i.e. $CC_0$115~$CC_3$130), while in UL communication two CCs can be utilized in carrier aggregation operations. In another example, $CC_0$ 115 and $CC_1$ 120 can be used for UL data transmission as “normal” CCs (as UL CCs that can be configured/utilized with SRS and any UL physical channel such as PUSCH or other physical channels together with SRS transmissions), and $CC_2$ 125~$CC_3$ 130 can be limited to be SRS CCs (CCs without other physical channel transmissions such as without PUSCH transmission) in order to facilitate the DL link adaptation.

The eNBs 110*a* can include or be separate from the remote radio head 110*b*. The dashed line communication links representing communication with $CC_2$ 125~$CC_3$ 130 is different from the solid line communication links representing communication with $CC_0$ 115 and $CC_1$ 120 because the dashed line communication links only allow for SRS transmission in the UL. As such, for UL the UE 140 on the $CC_0$ 115 and $CC_1$ 120 can transmit UL data to the eNB 110 on these, but on the right hand side the UE 140 can only transmit the SRS for UL from the UE 140 to the RRH 110*b*, for example, which can be separate from or a part of the eNB 110*a*. Further, all four CCs can transmit DL data from the eNB 110*a*, 110*b* or other base station, but only two CCs can enable UL communication or UL data because the UL collision rate can be much higher than in the DL, not only for reception but also in the need to transmit. Without expensing extra components, processing or power support for DL can be greater than in DL.

In addition, link adaptation can be difficult without the UL transmission for $CC_2$ 125~$CC_3$ 130 where these CCs have no UL transmission with legacy devices/UEs/network devices, while maintaining or keeping the number of RF chains or RF antenna processing chains for different carrier frequencies at about two, which can do TDD or carrier component switching between CCs (e.g., between two CCs). As such, legacy devices can still operate to perform switching between CCs, such as between $CC_0$ 115 and $CC_1$ 120 for UL transmission and still have $CC_2$ 125~$CC_3$ for the SRS transmission to enable channel estimation and link adaptation for a corresponding downlink.

The switching operations for TDD or time division multiplexing (TDM) can further be based on the subframe configuration that is utilized, especially if these two CCs can be enabled for other UEs so $CC_2$ 125~$CC_3$ 130 can also be utilized for the SRS. Thus, the UE can perform TDM switching between $CC_0$ 115 and $CC_1$ 120 and $CC_2$ 125~$CC_3$ 130 for better link adaptation for all four CCs, not just for the first two CCs. In one example, SRS transmission can then be performed with switching between, for example, $CC_1$ 120 and $CC_2$ 125, and the $CC_0$ 115 and $CC_3$ 130 in order to perform TDM switching for SRS transmission in non-legacy devices.

In the system 100, one CC can be designated as a primary CC (PCC) by a higher layer signaling (e.g., a radio resource control (RRC) signaling or other signaling for designating a PCC) on a per-UE basis. As such, the other CCs whether configured as a normal CC or a SRS CC can operate as a secondary CC (SCC). Certain uplink control information (UCI), including channel quality information (CQI), acknowledgement/negative acknowledgement (ACK/NACK), scheduling request (SR) etc., when transmitted on PUCCH, for example, can be carried on the PCC.

In an aspect, when an SRS is transmitted in a special subframe (e.g., an uplink pilot time slot (UpPTS), other subframe subsection/configuration or the like) or a normal UL subframe, the SRS can occupy the last single-carrier frequency division multiple access scheme (SC-FDMA) symbol of the special subframe.

In another aspect, SRS transmission can be started from a first symbol (e.g. symbol #0) in D-SRS subframe k or in a first subframe part of a plurality of subframe parts comprising a subframe, which can assume that a SRS switching is conducted in subframe k−1 with a shorten or punctured PDSCH/PUSCH transmission in case of a normal DL/UL subframe being utilized.

Table 1 below demonstrates various conditions that can dictate UE behaviors for SRS transmission. In particular, a number of instances can be seen where the conditions can cause SRS dropping, rather than a transmission of the SRS. This highlights the need for improved SRS transmission on CCs for which the UL is not configured for physical channel transmission, thereby improving link adaptation and beamforming speeds when exploiting channel reciprocity.

TABLE 1

SRS Collision handling in legacy LTE system.

| TAG Configuration | Conditions | UE behaviors of SRS Transmission |
|---|---|---|
| UE not configured with multiple TAG (M-TAG) | SRS + PUSCH;<br>SRS + PUCCH format 2a/2b or format 2 with HARQ-ACK transmissions<br>SRS + PUCCH transmission carrying HARQ-ACK and/or positive SR and if the parameter ackNackSRS-SimultaneousTransmission is FALSE.<br>SRS + PUCCH transmission carrying HARQ-ACK and/or positive SR using normal PUCCH format<br>SRS + PRACH | Dropping SRS |
| (continued from above) | Type 1 SRS + PUCCH format 2 without HARQ-ACK;<br>SRS + PUCCH transmission carrying HARQ-ACK and/or oositive SR using shortened format and if the parameter | Transmitting SRS |

TABLE 1-continued

SRS Collision handling in legacy LTE system.

| TAG Configuration | Conditions | UE behaviors of SRS Transmission |
|---|---|---|
| | ackNackSRS-SimultaneousTransmission is TRUE | |
| UE configured with M-TAG | SRS + PUSCH/PUCCH on different cells and in case of power limitation. | Dropping SRS |
| (continued from above) | SRS + PUSCH/PUCCH on different cells and when not power limited. | Transmitting SRS |
| (continued from above) | SRS + PUCCH/PUSCH/PRACH when power limited<br>SRS + SRS + PUSCH/PUCCH on more than 2 CCs in different TAGs and when power limited. | Dropping SRS |
| (continued from above) | SRS + PUCCH/PUSCH when not power limited<br>SRS + SRS + PUSCH/PUCCH on more than 2 CCs in different TAGs when not power limited<br>SRS + SRS | Transmitting SRS |

As seen in Table 1, when CA is configured for a UE 140, SRS transmission in a first cell/CC is dropped if the SRS symbol happens to collide with PUCCH or PUSCH in a second cell/CC. Such a rule can be modified to tie with or correspond to a timing advance group (TAG) configuration for a UE. In particular, this modification can be seen for the case when a single TAG is configured, the SRS dropping rule can be the same, except when multiple TAGs are configured for a UE, it can be allowed to have SRS collide with PUCCH/PUSCH of a different cell in the same symbol as long as the UE is not power limited. SRS transmission can be dropped in a power limited case, where a UE is power constrained or limited in power capability at the time than it otherwise would be in normal operation. As such, Table 1 summarizes the detailed UE behavior for SRS collision handling in the current LTE system.

Note that, under SRS CC-based switching in Rel-14, SRS dropping becomes even more serious issue due to a UE UL CA capability limitation, such as having only one or two RF chains for transmission/reception on a corresponding frequency band. For example, it is possible that even if in a non-power limited case for M-TAG, SRS on SRC CCs may collide with PUCCH/PUSCH transmission on normal CCs and exceed the UL CA capability of a given UE if all signals are being transmitted. In such a case, SRS transmission may further result in being dropped and further reduce the opportunities to transmit SRS. If the UE 140 is not power limited, the PUCCH and the SRS can be transmitted simultaneously in the legacy system. However, with an additional restriction (e.g., power limited/RF chain capability to one RF chain), even if the UE is not power limited in the legacy system, an increased probability of dropping the SRS could occur. Thus, the objective of SRS CC-based switching or TDD for SRS with SRC CCs for DL link adaptation cannot be achieved, further degrading DL performance for TDD systems. In contrast to proposed mechanisms, Table 1 demonstrates a de-prioritization of SRS as there are many cases or conditions that result in a drop of SRS.

Therefore, there is also need in the art for improved apparatuses or network devices and methods for SRS carrier based switching to minimize the collision between SRS on SRS CCs and PUCCH/PUSCH on normal CCs and guarantee the triggered SRS transmission on SRS CCs. For example, a first objection could be to avoid collisions with one or more signaling configurations or mechanisms.

In an embodiment, a different rule or operation can be defined that considers the SRS with a different functionality compared to the legacy system. Legacy SRS systems can still utilize other signals as with non-legacy systems, such as reference signals, PUSCH, the demodulation reference signal (DMRS), or the like, for the channel estimation and to circulate the DL link adaptation; however, for the CCs corresponding to/configure for SRS, the SRS can take priority over the other signals. For example, SRS can have a higher priority compared to a control channel or other physical channel, which is different from Table 1. In case of a collision occurring, the SRS can be prioritized so SRS can be ensured for the link adaptation functionalities in order to avoid/minimize the collision. Additionally or alternatively, the CCs can only be utilized for SRS only without any other physical channel or reference signal sharing the SRS CC or during any SRS generation/transmission.

Figure 2:
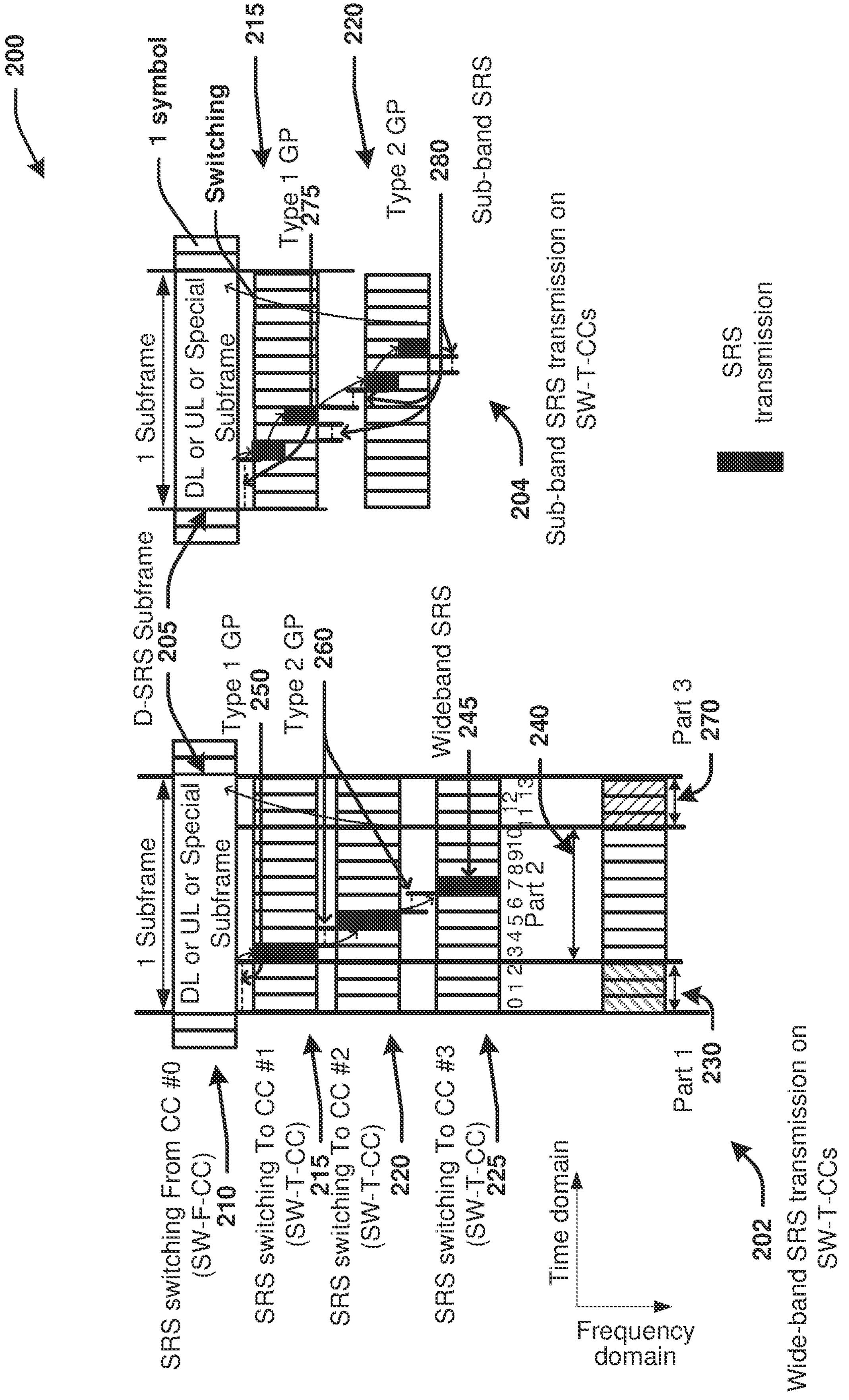
FIG. 2 illustrates an example of a dedicated sounding reference signal (D-SRS) configuration for wireless communications in a network environment for a UE or eNB according to various aspects or embodiments.

Referring to FIG. 2, illustrated is an example of dedicated SRS (D-SRS) subframe structures 200 that can be utilized in SRS CC-based switching operations for carrier aggregation in TDD CA systems. These D-SRS subframe structures can enable SRS transmission on SRS CCs and address the identified issues of SRS dropping to minimize the collision between SRS on SRS CCs and PUCCH/PUCCH on normal CCs in order to ensure SRS transmissions that have been triggered. The term "D-SRS subframe" can refer to a subframe (e.g., a DL subframe, a UL subframe or a special subframe) that is used for SRS transmission(s) on one or more SRS CCs. A special subframe can be distinguished from a normal UL/DL subframe such that special subframes can be a subset of a frame divided into different parts (e.g., part 1 (230), part 2 (240), and part 3 (270)) as well as the entire subframe not being used for only DL or only UL, but rather used for both DL transmission/reception and UL reception/transmission, respectively; further, there are no TDD operations within the subframe splits or parts, except in the middle part 2 (240) as a subset in special subframes, for example.

The D-SRS subframe, for example, can comprise a configuration that can be indicated/signaled semi-statically in a system information block (e.g., an SIB1), or by other means dynamically/semi-statically as described herein to minimize the interruption time caused by the SRS switching across multiple CCs. The example D-SRS subframe structures 200 can be used for SRS CC-based switching as part of a TDD CA operation in a communication between an eNB and a UE in a TDD CA system. In particular, as shown in the D-SRS subframe structure 205, each D-SRS subframe can be partitioned into three parts 230, 240 and 270 that can also include one or more symbols (e.g., orthogonal frequency-division multiple access (OFDMA) symbols). Part 1 (230) and part 3 (270), for example, can be associated with a predefined or pre-configured SRS switching period that can enable the transmission in a D-SRS subframe to be switched from one CC to another CC for transmission along multiple CCs. For example, switching can occur from a CC of one particular band (referred to as a switching-from-CC (SW-F-CC)) to another CC (referred to as a switching-to-CC (SW-T-CC)) as well as from a SW-T-CC back to a SW-F-CC, vice versa, or back and forth on different frequency bands (or CCs).

In an aspect, a UE 140 or eNB 110*a*/110*b* can enable a modification of a UL subframe configuration to a different UL subframe configuration based on one of a plurality of predefined UL subframe configurations received/transmitted as part of an uplink (UL) grant or a radio resource control (RRC) message. The plurality of predefined UL subframe configurations can include or support different ratios between PUSCH and SRS symbols for transmission.

In the examples of FIG. 2, a starting symbol of the SRS transmission can be located or begin on CC 215 (a first SW-T-CC), CC 220 (a second SW-T-CC), and CC 225 (a third SW-T-CC), occurring at symbols #3, #5 and #7, respectively. Other symbols or locations can also be envisioned as one of ordinary skill in the art could appreciate. As such, the SRS transmission initiates within part 2 (240) of the D-SRS subframe for either a wide-band SRs transmission on SW-T-CCs 202 or a sub-band SRS transmission on SW-T-CCs 204, depending on the D-SRS subframe structure or configuration activated or triggered, either by the eNB or a higher layer signaling.

In an aspect, the gap between the switching operations between a SW-T-CC and a SW-F-CC can be different. In one example, the type-1 guard period (GP) length 250 can be about 3 symbols, while the type-2 GP length 260 can be about 1 symbol. A guard period can also be referred to as a gap in transmission, or the place/time where no transmission can occur to protect from transmission overlap or interference, for example. In the type-1 GP (250), for example, the RF re-tuning can occur in one CC switching from one CC to other CCs, such as a switching from the SW-F-CC 210 to the SW-T-CC 215. The type-1 GP (250) can have an enlarged gap to accommodate this first RF re-tuning as well as enable the switching from receiving DL to transmitting UL, which can be in the same frame or set of subframes of a single transmission for a special subframe (e.g., part 2 240 of structures 202 or 204). In the type-2 GP (260), the length of the period or duration can be shorter in comparison because the SRS transmission has initiated and smaller tuning time can be utilized for SRS switching during the transmission.

In an aspect, a difference among transmission opportunities can be generated among the different D-SRS subframe structures 202 and 204. In terms of SRS bandwidth, the D-SRS subframe structure 202 can utilize a full bandwidth of a CC for one UE and the D-SRS subframe structure 204 can utilize a partial bandwidth. As such, for one CC (e.g., SW-T-CC 215), the D-SRS subframe structure 202 can have one transmission opportunity, such as with the symbol #3, and after transmitting the SRS, the next CC (e.g., SW-T-CC 220) can be switched to transmit the SRS with the symbol #5. In contrast, the D-SRS subframe structure 204 can enable SRS transmission at each CC with two opportunities per CC. This demonstrates the case, for example, that the SRS can be configurable for narrow band SRS transmission and if sending the SRS along the whole bandwidth multiple transmit opportunities could then be utilized in this network device (UE or eNB).

Further, the type 1 GP 250 operations can be considered inter-CC switching, while the type 2 GP 260 can be considered intra-CC switching and inter-CC switching within and among CCs 215-220, each utilizing the type-2 GP 280, for example, after the initial RF tuning from part 1 to part 2 during the type1-GP 275, or 210 depending on the structure 202/204 being utilized. When the UE, for example, is configured for narrowband SRS transmission, frequency hopping can be performed and between the hopping, the type 2 GP 280 can be utilized.

In one example illustration of how frequency hopping described above can be advantageous, a full bandwidth could be defined as about 36 resource blocks or physical resource blocks (PRBs) that the bandwidth is for this wideband transmission. For comparison, another bandwidth could be defined at about 4 PRBs as a narrowband transmission. However, these sizes could vary as one of ordinary skill in the art could appreciate, and this is only an example to provide a general comparison. Regardless, for the wideband example, one communication or transmission could be utilized for SRS in the structure 202 to cover the whole bandwidth. However, in the narrowband, one transmission is not always necessarily enough, and two or more operations or transmissions can be utilized by further switching or hopping. In another example, the whole bandwidth can be about 16 PRBs and the narrowband 8, or other similar variation with any number of hopping being utilized to cover the entire bandwidth for narrowband SRS transmissions.

Under SRS CC-based switching, the SRS could be dropped in case of collision with a UCI transmission on PUCCH/PUCCH in a D-SRS subframe 205 due to either power-limitation or restriction of UL CA capability for a given UE. In certain aspects, to guarantee the transmission of SRS on SRC CCs, separate DL/UL subframe configurations can be configured as references for different physical channels operations to minimize the collision of SRS with other UL channels (e.g. PUCCH, or the like). To avoid collision between SRS transmissions on SRS CCs and UCI transmissions or other physical channel transmission on normal CCs in a D-SRS subframe, SRS transmissions on SRS CCs can be limited to a subset of subframes that are not used for UCI transmissions. As discussed above, these configurations can resemble the D-SRS subframe structure 202 or 204 that can be determined/indicated/triggered based on the UL/DL configuration indicated in an SIB1. The reference configuration (or D-SRS subframe structure) can be used for DL HARQ operation. As a result, UL subframe resources between the PUCCH transmission and the SRS transmission on SW-T-CCs can be orthogonalized in time so as to not collide or interfere.

In certain other aspects, some information fields in a DCI format can also be interpreted differently, depending on the reference UL/DL configurations. For example, the 2-bit UL index in UL grants (i.e., DCI format 0 or 4) can be re-interpreted as a Downlink Assignment Index (DAI) to indicate the total number of DL assignments, if the DL reference configuration is not UL/DL configuration #0, even if the UL/DL configuration indicated by SIB1 is the configuration #0.

In addition, two different reference configurations, one for DL HARQ operation and the other for UL scheduling and HARQ operation, can be configured, either by the eNB, pre-configured, or signaled by a higher layer of signaling than the eNB. In one example, one reference configuration can be used for both DL HARQ and UL scheduling/HARQ operation. Reference configurations can also be semi-statically signaled using SIB1, or dedicated RRC signaling as part of or for an SRS CC-based switching configuration 202 or 204, or dynamically indicated using DCI format. As such, a UE can determine at least one of a number HARQ processes, a HARQ timing for the PDSCHs, transmission of periodic CSI feedback and SRS based on the DL HARQ reference configuration. In other embodiments/aspects, a UE can be configured by RRC signaling to perform SRS switching among a plurality of CCs within a cell group (CG), where one of the CCs is designated as the SRS SW-F-CC 210 while the remaining CCs can be indicated as SRS switching to CCs (SW-T-CCs) 215.

In further aspects/embodiments, a set of SRS transmission parameters on SW-T-CCs can also be configured for each CG or for each respective CC by higher layers signaling (e.g., through/via RRC messaging). These SRS transmission parameters can then be utilized to derive the configuration of the SRS transmission to be used, such as a normal DL/UL subframe or a special subframe as provided in the examples of D-SRS structures 200. The SRS parameters, for example, can include: a D-SRS subframe configuration (e.g., structures 202, and 204), a normal DL subframe or a normal UL subframe with the indication or signaling for such comprising explicitly/implicitly of a D-SRS subframe periodicity and a subframe offset value. For example, the D-SRS subframe 205 can be configured in a SIB-indicated UL subframe, a DL subframe, or a special subframe (e.g., structure 202, 204, or both) or a combination of these subframes.

Alternatively or additionally, the configuration can be limited to a special subframe only, a UL subframe only, or both in response to being indicated by the SIB 1, for example. As such, parameters or an indication of a particular configuration provided by the SIB 1 could indicate that a special subframe/UL subframe is going to be utilized for SRS transmission.

FIG. 2 in particular provides examples of special subframes that are divided into different parts (e.g., part 1 (230), part 2 (240), and part 3 (270)) and the entire subframe is not used for only DL or only UL, but both. Further, there is no TDD operation performed within the subframe splits or parts 1 (230) and part 3 (270), except in part 2 (240) when utilized in special subframes.

Various SRS parameters can be indicated in a semi-statically or dynamically signaling of the configurations, including the starting symbol of SRS transmission in a D-SRS subframe for each SW-T-CC, for example. One or more of the parameters alone or in combination can be utilized or indicated further to derive the designated configuration structure (e.g., D-SRS subframe structure 202 or 204 as special subframes, or other similar configuration for SRS transmission, such as normal DL/UL subframes) from the one or more parameters. Other parameters can include one or more of: a starting symbol of an SRS transmission, a subframe or symbol index, a last symbol, an SRS bandwidth or other parameters (e.g., hopping bandwidth, SRS CS, an SRS transmission comb, or other LTE parameters).

In an aspect, the starting symbol of an SRS transmission can be greater than a minimum guard period (GP) length (e.g., type-1 GP 250/275) that is utilized for SRS switching to the first SW-T-CC 215 within a CG. Alternatively, SRS transmission can be initiated from a first symbol (e.g. symbol #0) in D-SRS subframe k (i.e. size of part 1 230 in FIG. 2 is zero), assuming SRS switching is conducted in subframe k−1 with shorten or punctured PDSCH/PUSCH transmission in case of normal DL/UL subframe. As such, two parameters and the subframe index or the particular applicable subframe could be indicated together, such as by a D-SRS subframe periodicity, a subframe index and subframe offset. In addition, by configuring or signaling the starting symbol, the gap or GP lengths (e.g., 250 or 260) can be derived therefrom.

Similarly, the last symbol of D-SRS subframe n can be used for SRS transmission, assuming also that the SRS switching gap can be provided in subframe n+1 as the switching gap of part 3 270 plus one symbol, for example. A switching back period here can be taken into account in the last subframe of n+1 because the eNB could schedule data transmission or reception at a subsequent subframe.

As discussed above, SRS parameters can be signaled (or preconfigured as described herein) and the D-SRS subframe structure/configuration can be derived from the parameters (e.g., SRS bandwidth including transmission bandwidth and hopping bandwidth, if frequency hopping is enabled, SRS CS/circuit switching, SRS transmission comb, or the like). Alternative or additionally, the configurations or substructures themselves can be preconfigured or signaled with a particular indication that could include the structure, the GP length, or other data/parameters in relation to D-SRS subframe structure 202, 204 or a combination, for example.

Table 2 below illustrates an example lookup table for type-1 GP length configurations corresponding to different use cases. The length of a type-1 GP 250, for example, could be semi-statically configured for each SRS switching CC group for a UE or implicitly determined based on the CA type of SW-F-CC and the first SW-T-CC (e.g. same TAG or different TAG between the two CCs). Alternatively or additionally, the GP length configurations can be dynamically signaled by physical downlink control channel (PDCCH) that dynamically triggers SRS CC-based switching for a cell group (CG)/plurality of UEs from among multiple groups of UEs.

Alternatively or additionally, to simplify specification and implementation/testing efforts of SRS CC-based switching operations, a sub-optimal type-1 GP value/length could be defined for all cases, e.g. 3 symbols to then be fixed. A type-2 GP (260) can be utilized also for SRS switching among SW-T-CCs, except a first SW-T-CC, or in-band SRS frequency hopping. The length of type-2 GP (260) can be smaller than that of type-1 GP (250) assuming RF retuning (switching from transmission to reception, among CCs or vice versa) has been conducted within the type-1 GP (250) for a CG or UE.

TABLE 2

Type-1 GP length configuration for SRS CC-based switching

| Index | Switching GP length [Number of symbols] | Use Case |
|---|---|---|
| 0 | $N_1$ (e.g. 3) | SRS switching between CCs in a same TAG (Covering inter- and intra- band case with and without antenna switching) |
| 1 | $N_2$ (e.g. 4) | SRS switching between licensed CCs in different TAGs (Covering inter- and intra- band case with and without antenna switching) |
| 2 | $N_3$ (e.g. 5) | SRS switching between licensed CCs in different TAGs and at least one CCs on unlicensed band |

Figure 3:
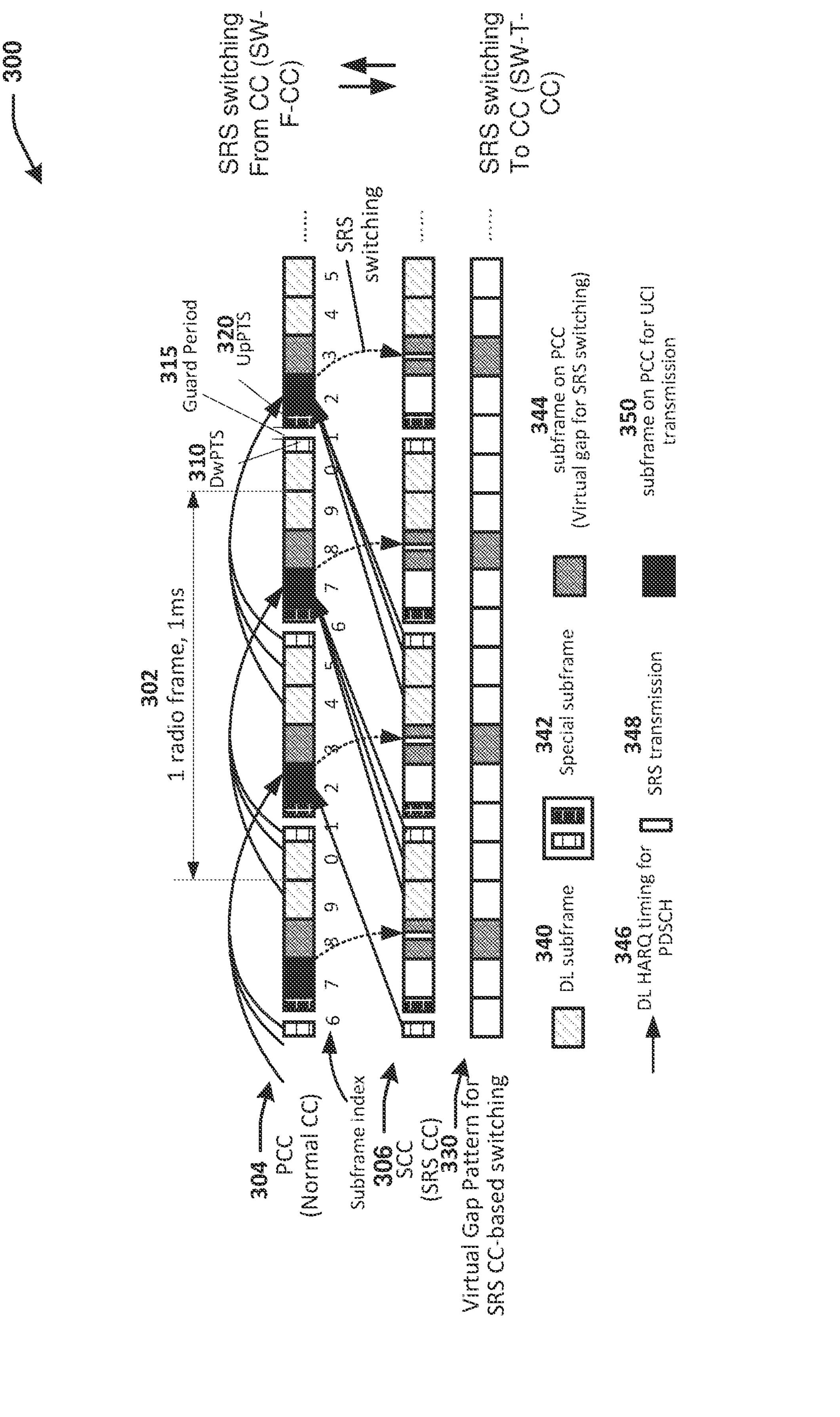
FIG. 3 illustrates an example of a D-SRS subframe generation based on a downlink (DL) reference configuration according to various aspects or embodiments.

FIG. 3 illustrates an example D-SRS subframe generated based on a DL reference configuration in accordance with one or more embodiments. In particular, a SRS CC-based switching operation 300 can be based on a particular reference configuration with various CCs in order to avoid collisions (e.g., between SRS and PUCCH or other physical channel transmission). As such, a reference configuration as discussed herein can be utilized to replace the signals with traditional higher priority (e.g., HARQ-ACK transmission) and enable the SRS to have single priority or higher priority instead.

For example, a UE can configure one or more CCs such as two CCs 304 and 306 that can be configured to perform the SRS CC-based switching operation from a UL/DL configuration #2 as the DL reference configuration. This DL reference configuration, in particular, can be used to determine the DL HARQ timing 346 between a physical downlink shared channel (PDSCH) and corresponding HARQ- ACK feedback on both a PCC 304 and one or more SCCs 306, for example, as well as SRS transmissions 348. The UL/DL configuration #1, in comparison to a UL/DL configuration #2, for example, can be a broadcasted configuration that is communicated/indicated in a SIB1 on the PCC 304 for legacy UEs, and can possibly also be further used for PUSCH scheduling timing for UEs configured with SRS CC-based switching (or non-legacy UEs).

In one embodiment, subframe (SF) #3 and #8 of each radio frame 302, a group/plurality of subframes of a transmission burst, (e.g., subframes indexed from 0 to 9) on the PCC (subframe on PCC with gap for SRS switching) 344 can be used to generate a potential SRS switching gap pattern 330 for SRS CC-based switching, instead of being used for a HARQ-ACK transmission. D-SRS subframes, for example, can be limited/assigned to correspond to SF #3 and SF #8 as illustrated as an example. Thus, orthogonality between SRS on SRS CCs (e.g., one or more SCCs 306) and PUCCH transmissions on PCC 304 can be achieved in the time domain without any potential collision. Each UL subframe can then carry HARQ-ACK bits for up to three DL subframes 340 on each CC.

In one embodiment, a UE 140 can modify a UL subframe configuration to a different UL subframe configuration that used previously based on one of a plurality of predefined UL subframe configurations received/transmitted as part of an uplink (UL) grant or a radio resource control (RRC) message, for eample. The predefined UL subframe configurations can include or support different ratios between PUSCH and SRS symbols for UL transmission.

The subframes on the PCC 304 with switching gap demonstrates the gap pattern or sequence for SRS CC-based switching operations. The subframes on PCC for UCI transmission 350 can be utilized for UL transmission so that the UE and the eNB can utilize PUCCH transmission based on the HARQ timing 346. In cases where SRS transmission is not competing for transmission resources, the HARQ payload could be distributed over all UL subframes such that PUCCH could transmit everywhere in the frame structure. However, if the UE has to perform the SRS transmission, then there could be a potential collision between the PUCCH and the SRS. Instead of the SRS getting dropped (even if the eNB/UE could benefit by transmitting/receiving the SRS) as a result of a scheduling carry over for the PUCCH, or SRS having a lower priority, an SRS CC can be configured by a reference configuration along with one or more parameters being signaled for a data transmission. In an aspect, based on this reference configuration, the possibility of transmitting the ACK-NACK in this potential SRS subfame could be excluded, and the UCI transmission, for example, can be allowed only in the subframe(s) 350 that are not configured with the SRS transmission. Thus, a collision of the UL control with the SRS can be more likely to be avoided, and mechanisms or operations can be defined such as by one or more rules or commands to do TDM between these two channels, but for the ACK-NACK communication, for example, there is no physical channel to allow TDM in particular.

In an embodiment, to avoid the collision between the UCI transmission and the SRS transmission, such a transmission could be limited to only a subset of the subframe that actually determines the UL/DL configuration indicated by the SIB 1 on the reference indication. A reference configuration (DL/UL reference configuration) being signaled or a parameter by which to derive the intended reference configuration of subframes could indicate how to configure the UL. This can be signaled, for example, on the SIB 1 or by the RRC messaging.

Further, in order to minimize the SRS switching overhead (especially in cases, for example, where switching time across CCs is just 2 or 3 symbols), mechanisms to enable data transmission in D-SRS subframe SF #3 or 8, for example, can be used to improve link adaptation and beamforming for efficient transmission/minimizing performance loss. Certain aspects of this disclosure thus provide methods/mechanisms to support transmit PDSCH or PUSCH on SW-F-CCs (e.g., 210 of FIG. 2) or PDSCH on SW-T-CCs (e.g., 215-228 of FIG. 2) in a D-SRS subframe with SRS transmission. To do this, the eNB could use special subframes 342, multicast-broadcast single frequency network (MBSFN) subframe, or a normal UL subframe on SW-T-CCs to be compatible with legacy UEs, as discussed further below. The special subframe 342 can include a downlink pilot time slot (DwPTS) 310, a gap or guard period 315 and the uplink pilot time slot (UpPTS) 320 by which to receive UL and transmit UL in a subframe or symbol for example.

Figure 4:
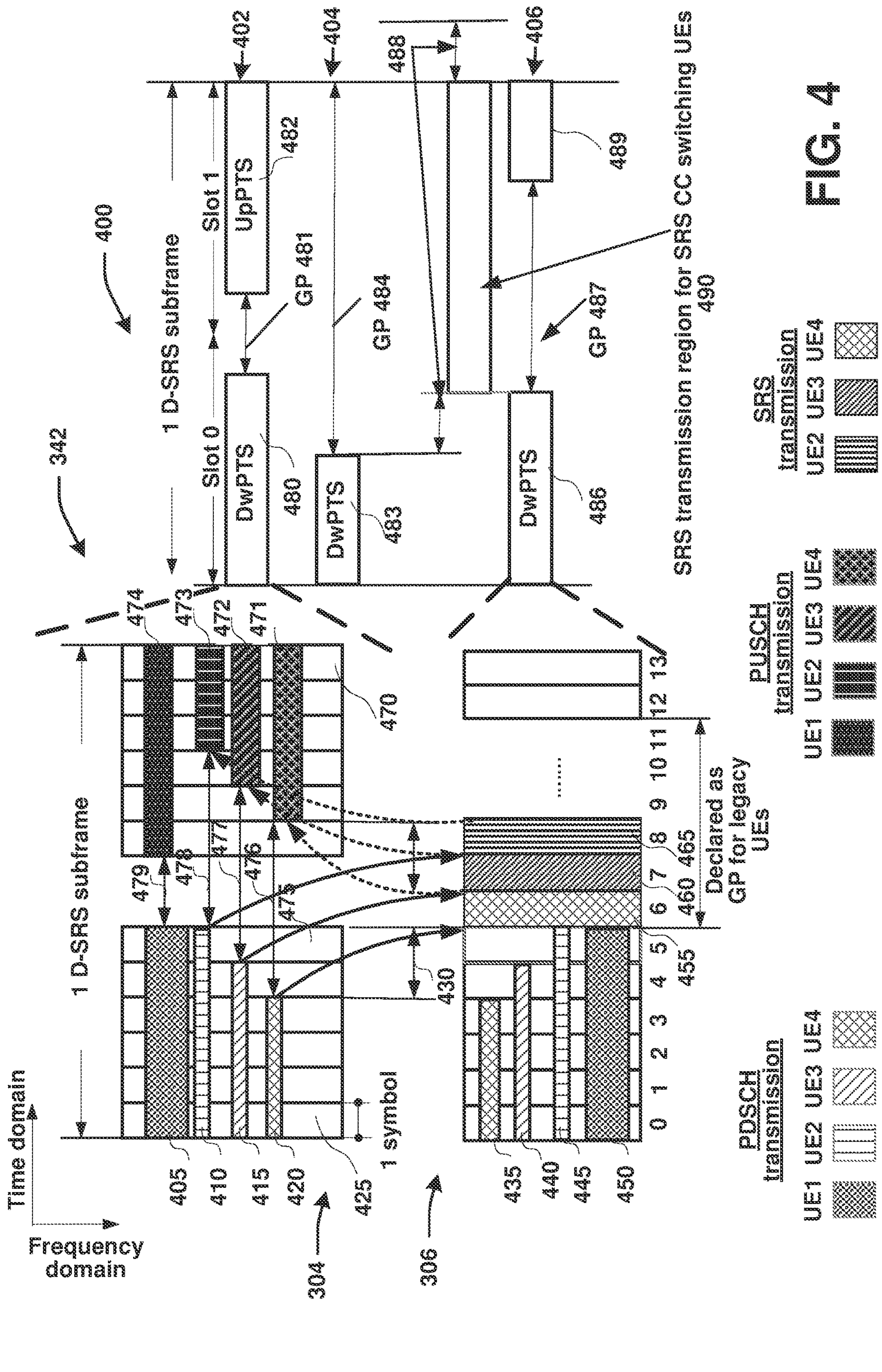
FIG. 4 illustrates an example of SRS component carrier (SRS CC) switching operations including guard period and an uplink pilot time slot (UpPTS) symbols on switching-to-CCs (SW-T-CCs) according to various aspects or embodiments.

Referring now to FIG. 4, illustrated is another example of SRS CC based switching utilizing GP and UpPTS symbols in a special subframe 342 configuration on various CCs along a time domain and a frequency domain. The example delineates aspects particular to a special subframe configuration that can include UE specific configurations for multiple UEs in the same subframes. SRS transmissions on SW-F-CC (e.g., 210/304) as a PCC and one or more SW-T-CCs (215/306) as a SCC, respectively, can be implemented by using the GP 315/UpPTS 320 of special subframe 342 of FIG. 3, for example.

An example special subframe 342 can be seen on the left and to the right SRS special subframe configurations X 402, Y 404 and Z 406 are illustrated for example. Configuration 402 on the right can be a special subframe configuration. Configuration 404 can be a special subframe configuration for frequency hopping UEs in a GP 484. Configuration 406 can be for legacy UEs, for example.

The special subframe 342 can generate SRS transmissions (e.g., 455-465) to occur on a SW-T-CC (e.g., 215-225 of FIG. 2) and include a GP 487 and UpPTS 489, as well as a DwPTS 486 along a number of symbols 425 that can be about fourteen symbols from symbol 0 to symbol 13 in a D-SRS configuration of a subframe, for example. This special subframe 342 can correspond to SF #1, or SF #6 or both in a radio frame (see e.g., subframe 342 of FIG. 3). In particular, the special subframe configuration (SSC) of SW-F-CC and SW-T-CC(s) may or may not be the same. For example, the GP on SW-T-CCs 306 serving multiple UEs for SRS transmissions and the GP sizes can depend on the number of served UEs (UE 1-UE 2), as well as potentially the switching times 476-478 from a SW-F-CC to the SW-T-CC 306.

To enable backward compatible design, for example, the frame structures supporting SRS CC-based switching can be compatible with the existing LTE specification and the special subframe configuration X 402 and Y 404 in FIG. 4. The configurations 402 and 404 can be signaled/indicated by SIB 1 to the legacy UEs specifically as one of special subframe configurations specified in 3GPP TS 36.211 section 4.2. Special subframe configuration (SSC) #9 (e.g., DwPTS:GP:UpPTS=6:6:2 in corresponding symbols) can be configured for SW-T-CC, for example, and indicated in SIB 1. Legacy UE 1 can receive PDSCH 405, 450, with a gap 479 for switching from reception to transmission, and transmit the PUSCH 474 in accordance with SSC #9 configuration.

In addition, one or more other UEs can be configured to transmit SRS on the SW-T-CC to an eNB using a symbol within a region 490 that can include a full or portion of the GP 487 and the UpPTS 489. UE-specific SRS transmission symbols 455, 460, 465 on SW-T-CC 306, for example, can be configured as symbol #6, #7, and #8 in a corresponding GPs 476, 477, 478 for UE 4, UE 3 and UE 2, respectively. The UEs 2-4 can receive PDSCH 410/445, 415/440, 420/435, switch to transmission at gaps 478-476, and transmit the uplink transmission as the SRS 455-465 and PUSCH 473-471, respectively, in accordance with TDM operations across SSC #9 306 and PCC 304.

In an example, the switching time for SW-F-CC 304 to SW-T-CC 306 can be about 2 symbols 430. As such, UE 2 can receive PDSCH 410 and 445 on two CCs 304, 306 using symbols 0-5. Symbols 6-7 (e.g., 455, 460) and 9-10 of this subframe, for example, can be used for CC-based switching (e.g., DL reception to UL transmission) depending on the UE and the gaps 476-479. UE 2, for example, can transmit SRS in symbol #8 465 in GP 487 on SW-T-CC 306 and potentially transmit PUSCH/SRS using symbols 11-13 on a SW-F-CC. For UE 3 and UE 4, PDSCH 415/440 and 420/435, respectively, can be transmitted with a less number of symbols compared to UE 2 in UE-specific virtual DwPTS region 483 in order to create GP 484 for these UEs to switch from SW-F-CC to SW-T-CC for SRS transmissions. The number of symbols punctured by the UE for receiving PDSCH can be explicitly signaled as part of a DL grant or implicitly determined by the UE based on the switching time being utilized in switching from SW-F-CC to SW-T-CC and the configured SRS symbol to be transmitted on the SW-T-CC.

Symbols 0-3 can be used for PDCCH/PDCCH reception 420 for UE 4, assuming 2-symbols (e.g., 430) can be utilized for switching and symbol #6 455 be configured for SRS transmission. However, symbols 0-4 can be used for UE 3 as symbol #7 460 is configured for SRS. If a UE is scheduled to transmit SRS in the last symbol of UpPTS or the UL subframe, a GP 488 can be created by enabling this UE to skip several symbols at the start or a full subsequent subframe.

In an aspect, UE 3 can transmit data relatively longer than UE 4, for example, because it can configure a later symbol 460 for SRS transmission generation. The switching gaps 477 and 476 for these UEs, respectively, can be about the same. After transmitting the SRS 455 and 460, respectively, the UEs 3 and 4 can switch back to the UL part (e.g., in slot 1 of region 482 or 470) from the DL part 475 for further data transmissions 472-471. As such, additional resources can be enabled for the DL reception and UL transmission. Additionally, the transmission TDM operations can be configured to be UE specific because the special subframe configuration (e.g., configuration X with DwPTS 480, GP 481, and UpPTS 482) can be cell specific.

In an aspect, UE 4 and the UE 3 can configure their corresponding communications with different special subframe configurations 402, 404, or 406, for example, from one another for corresponding SRS transmission and maximize the peak data rate in this way. The DwPTS 480, 483, or 486 can be for the symbols the UEs can use for the DL reception. For example, there can be about 14 symbols, divided by six for DL for the UE, six for the GP, and two for UL along the SCC 306 or SW-T-CC, in which the gap set could depend on the number of serving UEs that are possible.

In an aspect, a UE 140 or eNB 110*a*/110*b* can enable a modification of a UL subframe configuration to a different UL subframe configuration based on one of a plurality of predefined UL subframe configurations received/transmitted as part of an uplink (UL) grant or a radio resource control (RRC) message. The plurality of predefined UL subframe configurations can include or support different ratios between PUSCH and SRS symbols for transmission and vary in symbols depending on the parameters or network conditions as discussed herein with various aspects/embodiments/examples.

Figure 5:
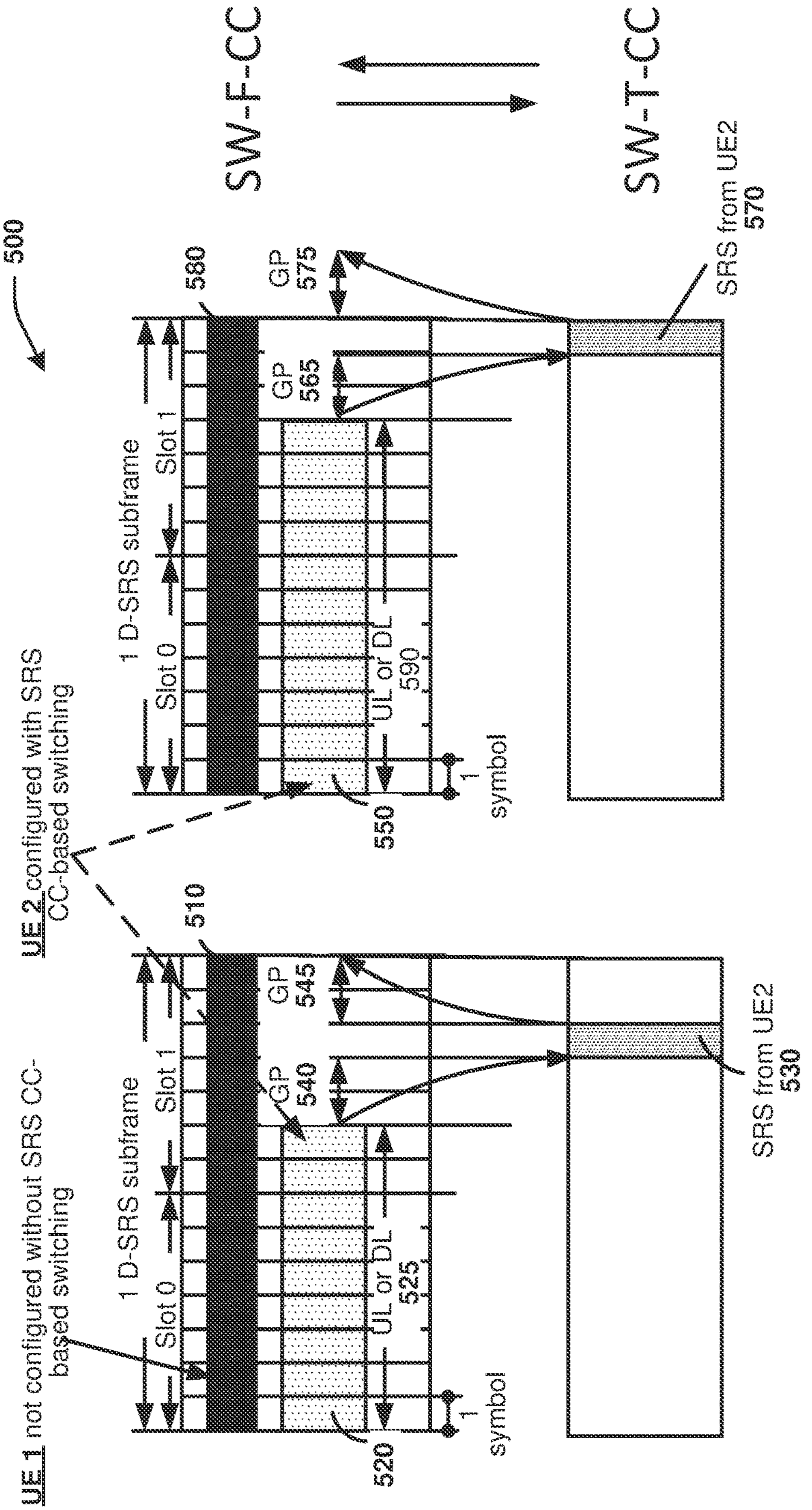
FIG. 5 illustrates an example a physical uplink shared channel (PUSCH) transmission or a physical uplink control channel (PUCCH) transmission in a D-SRS subframe on a switching-from-CC (SW-F-CC) according to various aspects or embodiments.

Referring to FIG. 5, illustrated is an example of UL communication structure(s) 500 in a D-SRS subframe on a SW-F-CC. For example, the UL communication structures 500 can be PDSCH/PUSCH on a SW-F-CC (e.g., SW-F-CC 210 or 304).

In an embodiment, PUSCH or PDSCH 525 or 590 can be transmitted in a UE-specific D-SRS subframe on a SW-F-CC to improve the resource efficiency. The transmission can utilize a normal UL or DL subframe as illustrated, as well as a special subframe as described in other embodiments herein. As such, a punctured channel structure can be established, especially for the UEs to perform the SRS switching. For example, if the UE wants to switch from transmitting or receiving data in the parts (525/590), then the UE will perform the SRS switching according to the switching gap or guard period the 540/545. The D-SRS subframe structure can then be indicated to the UE for the part of the DL/UL portion 525 and the gap 540/545.

The number of available symbols in this D-SRS subframe 500 for the UE 2, as compared to a normal subframe or UEs not configured with this subframe as D-SRS SF 510, 580 (e.g., UE 1, as also in FIG. 3), can be less (e.g., about 9 symbols), due to the 2-symbols of GP 540/545 for SRS switching and a 1-symbol for SRS transmission 560. Correspondingly, the number of available REs or REs per RB for data mapping could also be less. The assigned number of transport blocks size (TBS) for UL or DL portions 525 or 590 can be adjusted, for example, by multiplying the received RB allocation by an adjustment factor or scaling factor.

In one example, a rate-matching operation can be performed to map the encoded data symbols on the shorted PUSCH/PDSCH channel. In case of a UL subframe being utilized, the presence of a demodulation reference symbol (DMRS) in a slot 1 for UE 2 can be indicated by an RRC message or PDCCH explicitly or implicitly based on the GP length. Depending on the configured GP length, UL transmission 525 or 590 can be limited to slot 0 only. GP can be either allocated in this D-SRS subframe as GP 545 or alternatively created in the next subframe as illustrated with GP 575.

In an aspect, switching for SRS transmissions can be performed on only one subframe to reduce impact to the next subframe, but can also be distributed over two consecutive subframes. For example, the switching can utilize the gap (540/545, 565/575) as two symbols, where the gap can actually be punctured by enabling the UE to perform switching to puncture the first symbol (e.g., 520 or 550).

In another aspect, if the puncturing structure is established or defined the UE can determine the transmission block size based on the frequency domain resources, or how many PRBs. However, if there is no difference compared to the existing system in terms of frequency as there could still be six PRBs, for example, the time domain resources can still be reduced, such as from 14 symbols as with UE 1 not configured for SRS CC-based switching to 510, 580 to about 9 symbols for UE 2 at 525 with a transport block size (TBS) scaling. If the given code rate is maintained, for example, then the TB size can be reduced to still reduce the resources for the information translation. Thus, a corresponding scaling vector can be defined, either explicitly as signaled by the eNB signal or an implicit derivation. A punctured symbol can be done in a structure like the DL/UL part 525, then when doing the decoding a multiplication can be performed by this scalar vector to determine the TB size, for example. On the UE side some scaling down can be done for the TB size, and perform an align between the eNB and UE so there is no issue between the transmitter and the receiver because both could know the chunk bit structure.

Figure 6:
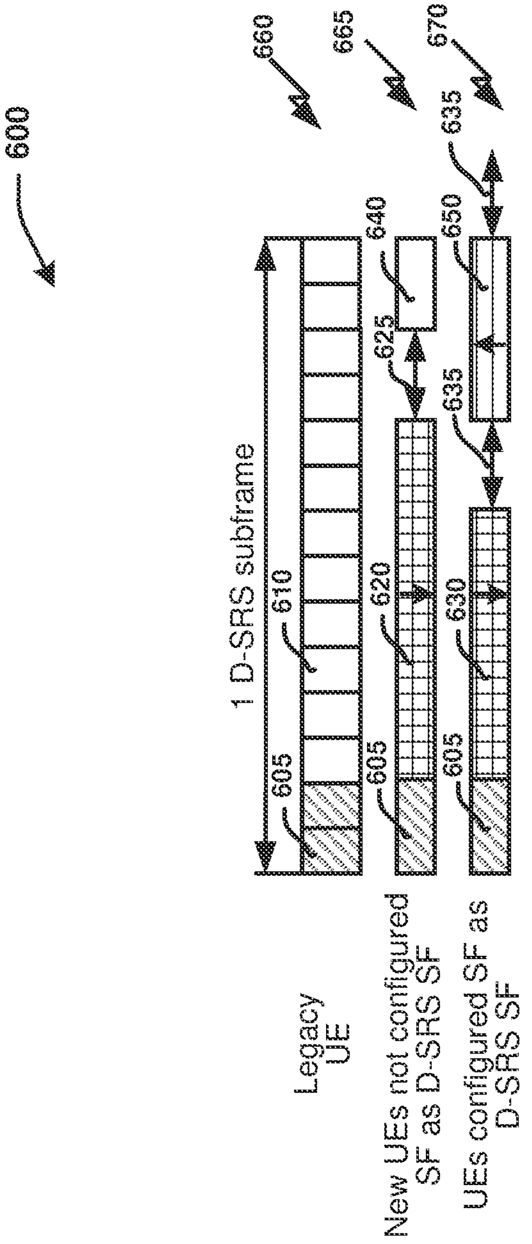
FIG. 6 illustrates an example D-SRs subframe that utilizing at least a part of a multicast-broadcast single frequency network (MBSFN) subframe according to various aspects or embodiments described herein.

Referring to FIG. 6, illustrated are examples of D-SRS subframes 600 utilizing a part of an MBSFN subframe, for example. In some aspects, an eNB can dynamically switch SRS transmissions to SW-T-CCs using part of a normal DL subframe. An eNB, for example, can declare some SFs as MBSFN subframes 600 for legacy UEs such as through system information signaling/communication. For a given SF declared as an MBSFN SF, all UEs could expect cell specific reference signal (CRS) in the first one or two symbols period 605. MBSFN subframes can use some subframe resources to do the broadcast, which is different from unicast, as it is targeted for a plurality of UEs over just one UE.

In addition, the eNB can send a signaling message to inform one or more new UEs configured for SRS CC-based switching transmission of a selected SSC 660, 665, 670 for the SFs declared as the MBSFN subframe. In this embodiment, normal UEs can be considered that are not configured for SRS switching with only one CC being used for SRS in TDM operations, but can still utilize some of the data parts such as data part 610. The new UEs (e.g., release 14 or beyond) could process each subframe declared as the MBSFN subframe based on the SSC 665 selected for that D-SRS subframe, e.g. receiving PDSCH in the DwPTS 620 and transmitting PUSCH in UpPTS 640 if scheduled by the eNB.

Moreover, UEs that configured the SF as D-SRS SF 670 can be assigned one symbol in region 650 for SRS transmission. The SRS transmission region can include GP 625 and UpPTS 640 subject to the SSC 665, assuming a shorter DwPTS length 630 is used for PDSCH transmission to create switching time 635 within the period 620. A full UpPTS 640 can be used for SRS when the eNB decides to not schedule any UL transmission in 640 for other UEs.

In particular, where a limited number of SRS switching UEs and a normal UE, even if not configured with SRS switching the UEs can still utilize this MBSFN subframe for this transmission. For example, in an extreme case, if only one is UE configured with SRS switching capability, then in this case if it is limited the portion 650 only for the SRS UE then the resource efficiency is low, but can still allow a new UE to use it then and further use all the resources for the transmission.

Figure 7:
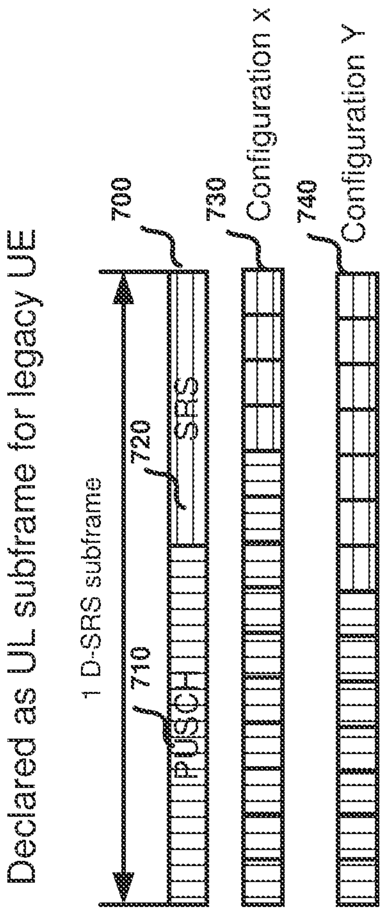
FIG. 7 illustrates an example subframe structure/configuration for multiplexing PUSCH and SRS according to various aspects or embodiments.

Referring to FIG. 7, illustrated is an example of a subframe structure for multiplexing PUSCH and SRS in accordance with embodiments/aspects herein. In particular, for the SRS capable UE, different configurations can be defined depending on how many UEs are to be configured to accommodate for the SRS transmissions. For example, configuration X 730 could have relatively small SRS opportunities, but configuration Y 740 could can provide more.

According to some aspects of the disclosure, an eNB can dynamically switching SRS transmissions to SW-T-CCs using part of a normal UL subframe. For legacy UEs, the normal UL subframe can be indicated/signaled through SIB1 message. However, the eNB may schedule no UL transmission or only SRS transmission in the last symbol of this subframe for legacy UEs. A plurality of new subframe structures e.g. 730 and 740 in FIG. 7 can be defined in specification for different use cases. A configuration can be dynamically selected and signaled as part of a UL grant or semi-statically indicated using RRC signaling to a new UE (a UE configured to generate SRS switching) to efficiently utilize the D-SRS SF resources by adapting the resource splitting between PUSCH 710 and SRS 720 to the number of SRS UEs.

The different configurations could be defined for different use cases depending, for example, on the SRS payload and then on the configuration that may be selected as indicated by the RRC to the UE. Then the UE can use this to perform the SRS transmission. In a normal UL subframe only one SRS transmission opportunity can be provided. This is a current limitation defined because the goal is to maximize the data resources within the subframe, and thus, to limit it so the SRS is only one. However, limiting the SRS by one symbol, means it can only be used by one UE for example by this transmission case.

For example, for one UE there could be switching from one CC to here. If the SRS is only limited by one symbol, it means if there are ten UEs, for example, TDM has to be performed to utilize the ten UL subframes to do the SRS transmission or the downlink. But if more than one is allowed, for example, such as four UEs. Then just one dedicated SRS subframe can be configured to allocate a different symbol for each with one symbol to complete the SRS for the transmission for the SRS CC within one subframe. As such, an advantage is being able to minimize the legacy because SRS subframe can be completed with a larger SRS capacity.

According to another aspect of this disclosure, a dynamic aperiodic SRS (A-SRS) transmission timeline can be provided. For example, A-SRS transmission timeline can be explicitly signaled to a UE using a new information element (IE) in DCI format (e.g., DL grant). In one aspect, a combination of RRC and dynamic signaling could be used. For example, a total of four A-SRS transmission timelines could be configured by RRC signaling, and dynamic signaling could use 2 bits to indicate which of these four RRC-signaled timelines (e.g. index) should be used for this triggered A-SRS.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or pre apart from those illustrated and/or described herein. In addition, not all illustrated acts may be required to implement one or more aspects or embodiments of the description herein. Further, one or more of the acts depicted herein may be carried out in one or more separate acts and/or phases.

Figure 8:
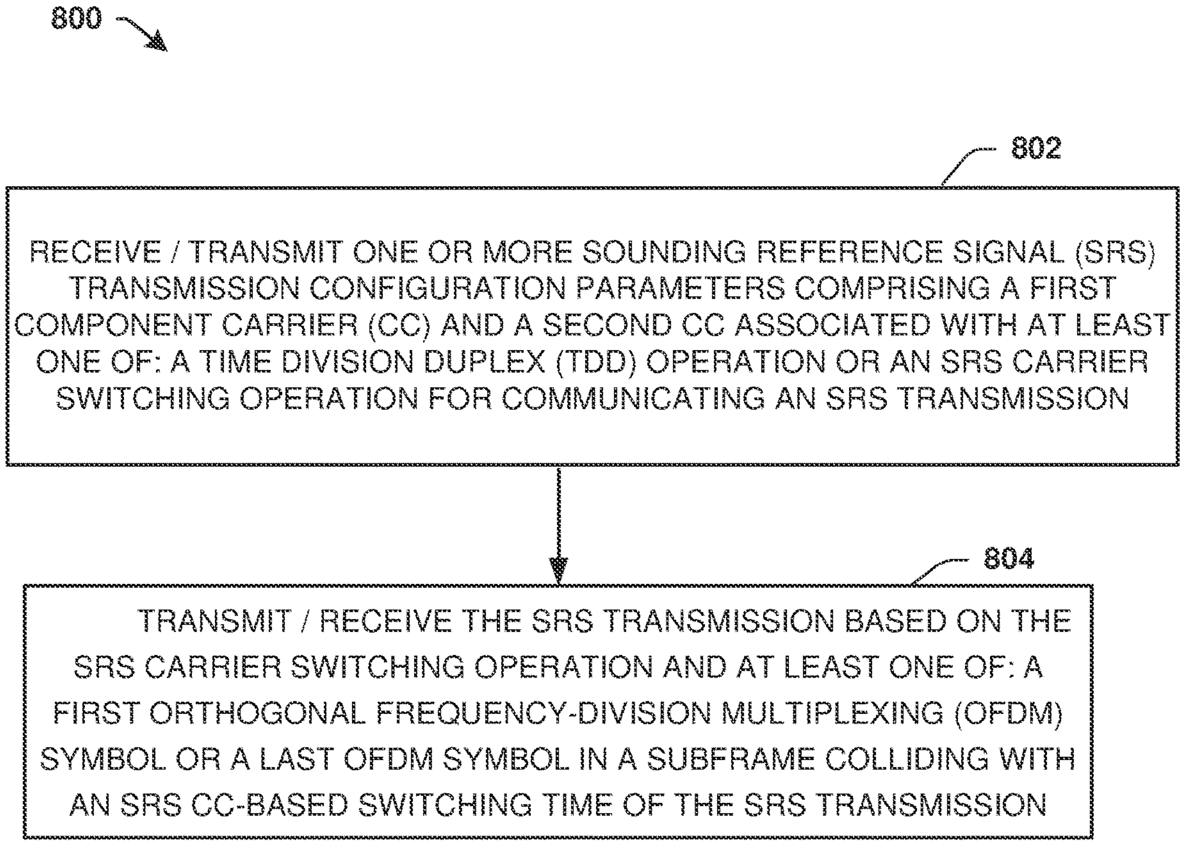
FIG. 8 illustrates a process flow of processing or generating SRS transmissions based on SRS configurations and parameters according to various aspects or embodiments described herein.

Referring to FIG. 8, illustrated is a process flow for performing operations for SRS communications in a network environment. A method 800 initiates at 802 with an UE or eNB, for example, receiving/transmitting one or more sounding reference signal (SRS) transmission configuration parameters comprising a first component carrier (CC) and a second CC associated with at least one of: a time division duplex (TDD) operation or an SRS carrier switching operation for communicating an SRS transmission. The second CC can be configured to enable the SRS transmission with priority over a physical uplink shared channel (PUSCH) transmission or a physical uplink control channel (PUCCH) transmission, according to an SRS transmission configuration. In other aspects, the second CC can be configured only for an SRS transmission in the case of a collision or conflict between the PUSCH or PUCCH for example.

At 804, the method 800 further comprises transmitting/receiving the SRS transmission based on the SRS carrier switching operation and at least one of: a first orthogonal frequency-division multiplexing (OFDM) symbol or a last OFDM symbol in a subframe colliding with an SRS CC-based switching time of the SRS transmission.

In other aspects, the process flow 800 can include configuring or counting one or more resource elements (REs) of the first OFDM symbol or the last OFDM symbol of the subframe in a PUSCH mapping and not in the PUSCH transmission. Thus, the PUSCH mapping can be performed based on the REs first or last OFDM symbol, but not a PUSCH transmission. Then the second CC, for example, could be not used for the PUSCH transmission or the PUCCH transmission, based on the SRS transmission configuration.

In one example, SRS transmission configuration parameters can comprise at least one of: a starting symbol of the SRS transmission in a dedicated SRS (D-SRS) subframe on the second CC and the SRS CC-based switching time of the SRS carrier switching operation.

In other aspects, the process flow 800 can include identifying a period comprising a reduced number of symbols in the D-SRS subframe based on the SRS CC-based switching time and the starting symbol of the SRS transmission on the second CC. A physical downlink shared channel (PDSCH) can then be shared based on the identified period in the D-SRS subframe. The SRS transmission can then be performed on the second CC at the starting symbol in the D-SRS based on the one or more SRS transmission configuration parameters.

In other aspects, the process flow 800 can further include identifying one of a plurality of switching guard period (GP) values from a SRS CC-based switching time, wherein the plurality of switching GP values vary according to whether the first CC and the second CC are associated with a same timing advance group (TAG) or different TAGs.

The SRS transmission configuration of the SRS transmission can be based on the one or more SRS transmission configuration parameters that include the SRS CC-based switching time. The one or more SRS transmission configuration parameters can be received by a radio resource control (RRC) signal with the one or more SRS transmission configuration parameters on the first CC, for example or on a SIB 1.

In another embodiment, a hybrid automatic repeat request (HARQ) timing can be determined for at least one of: the first CC or the second CC, based on a received DL reference configuration. A part of one or more subframes can be configured separate from a HARQ feedback as D-SRS subframes for the SRS transmission. A communication can be performed using at least one of: the first CC or the second CC and performing the SRS carrier switching operation based on the HARQ timing and a D-SRS switching pattern.

Figure 9:
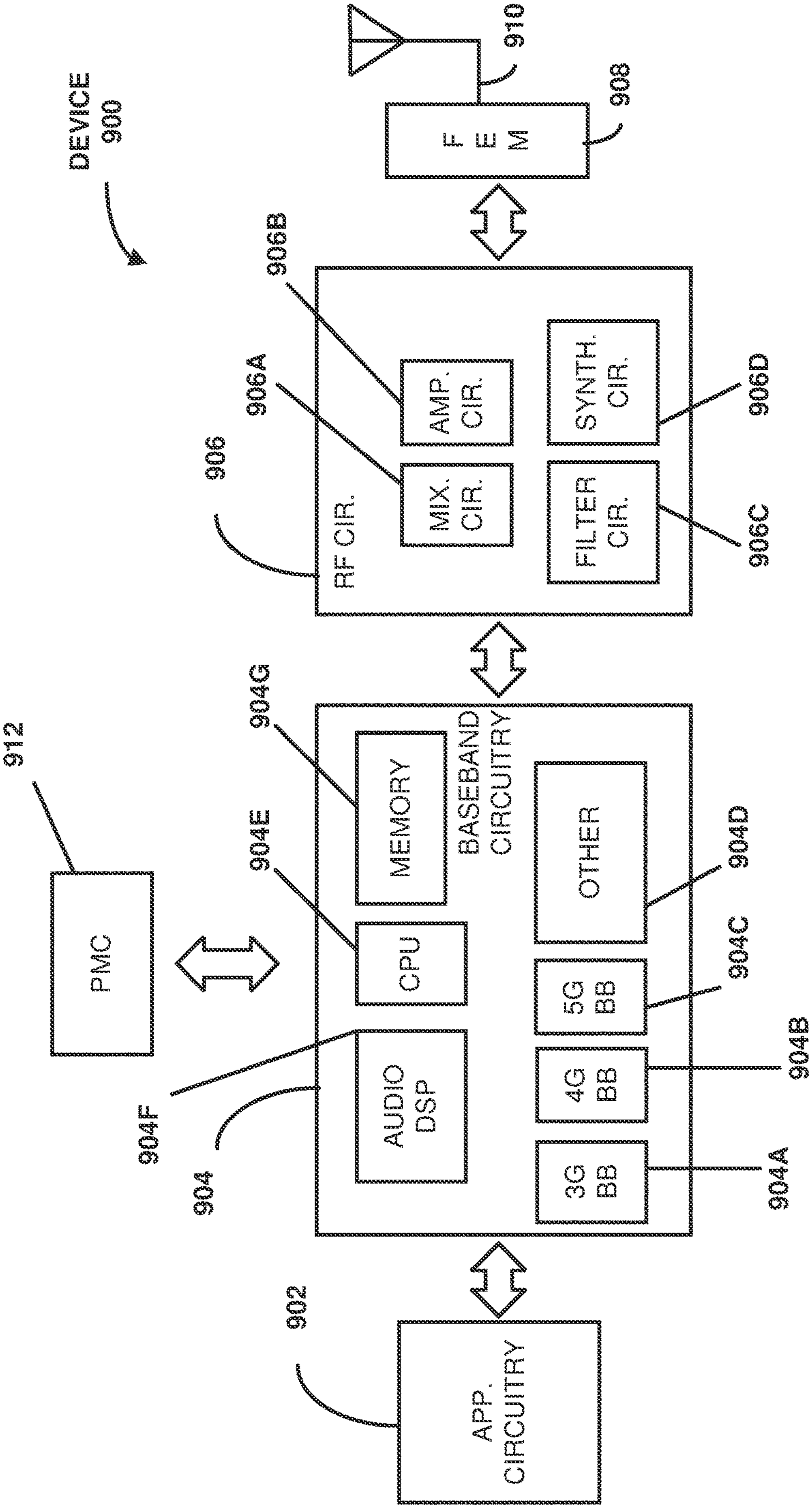
FIG. 9 illustrates an example system or device for a UE or eNB that configures SRS CC based switching operation according to various aspects or embodiments

FIG. 9 illustrates example components of a device 900 in accordance with some embodiments. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), si9h generation (6G), etc.). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP)

904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906*a*, amplifier circuitry 906*b* and filter circuitry 906*c*. In some embodiments, the transmit signal path of the RF circuitry 906 may include filter circuitry 906*c* and mixer circuitry 906*a*. RF circuitry 906 may also include synthesizer circuitry 906*d* for synthesizing a frequency for use by the mixer circuitry 906*a* of the receive signal path and the transmit signal path. In some embodiments, the mixer circuitry 906*a* of the receive signal path may be configured to down-convert RF signals received from the FEM circuitry 908 based on the synthesized frequency provided by synthesizer circuitry 906*d*. The amplifier circuitry 906*b* may be configured to amplify the down-converted signals and the filter circuitry 906*c* may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906*a* of the receive signal path may comprise passive mixers, although the scope of the embodiments is not limited in this respect.

In some embodiments, the mixer circuitry 906*a* of the transmit signal path may be configured to up-convert input baseband signals based on the synthesized frequency provided by the synthesizer circuitry 906*d* to generate RF output signals for the FEM circuitry 908. The baseband signals may be provided by the baseband circuitry 904 and may be filtered by filter circuitry 906*c*.

In some embodiments, the mixer circuitry 906*a* of the receive signal path and the mixer circuitry 906*a* of the transmit signal path may include two or more mixers and may be arranged for quadrature downconversion and upconversion, respectively. In some embodiments, the mixer circuitry 906*a* of the receive signal path and the mixer circuitry 906*a* of the transmit signal path may include two or more mixers and may be arranged for image rejection (e.g., Hartley image rejection). In some embodiments, the mixer circuitry 906*a* of the receive signal path and the mixer circuitry 906*a* may be arranged for direct downconversion and direct upconversion, respectively. In some embodiments, the mixer circuitry 906*a* of the receive signal path and the mixer circuitry 906*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906*d* may be a fractional-N synthesizer or a fractional N/N+1 synthesizer, although the scope of the embodiments is not limited in this respect as other types of frequency synthesizers may be suitable. For example, synthesizer circuitry 906*d* may be a delta-sigma synthesizer, a frequency multiplier, or a synthesizer comprising a phase-locked loop with a frequency divider.

The synthesizer circuitry 906*d* may be configured to synthesize an output frequency for use by the mixer circuitry 906*a* of the RF circuitry 906 based on a frequency input and a divider control input. In some embodiments, the synthesizer circuitry 906*d* may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906*d* of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node.

Figure 10:
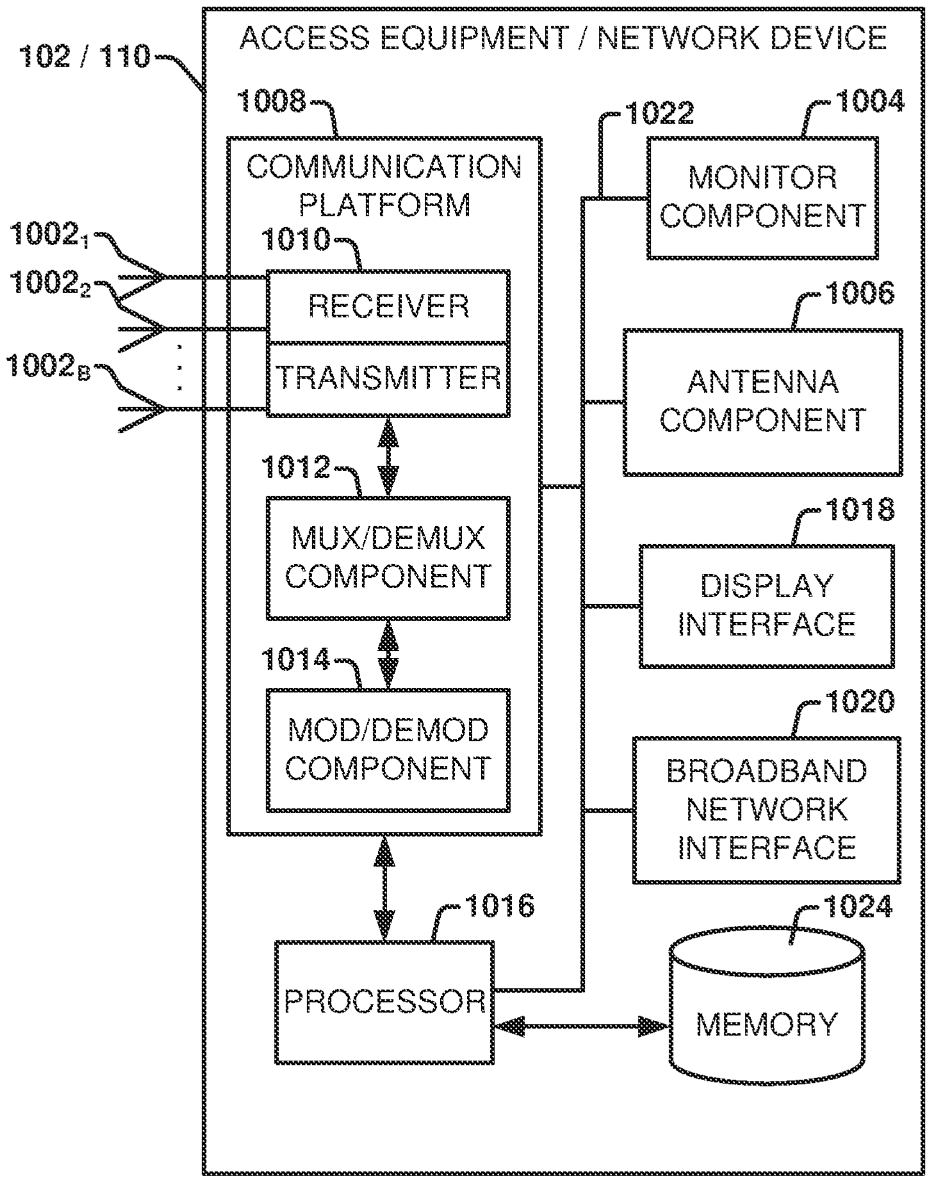
FIG. 10 illustrates another example system or network device operable with one or more components configured for various aspects or embodiments described herein.

To provide further context for various aspects of the disclosed subject matter, FIG. 10 illustrates a block diagram of an embodiment of access (or user) equipment related to access of a network (e.g., network device, base station, wireless access point, femtocell access point, and so forth) that can enable and/or exploit features or aspects disclosed herein.

Access equipment, a network device (e.g., eNB, network entity, or the like), a UE, or software related to access of a network can receive and transmit signal(s) from and to wireless devices, wireless ports, wireless routers, etc., through segments $\mathbf{1002}_1$-$\mathbf{1002}_B$ (B is a positive integer). Segments $\mathbf{1002}_1$-$\mathbf{1002}_B$ can be internal and/or external to access equipment and/or software related to access of a network, and can be controlled by a monitor component 1004 and an antenna component 1006. Monitor component 1004 and antenna component 1006 can couple to communication platform 1008, which can include electronic components and associated circuitry that provide for processing and manipulation of received signal(s) and other signal(s) to be transmitted.

In an aspect, communication platform 1008 includes a receiver/transmitter 1010 that can convert analog signals to digital signals upon reception of the analog signals, and can convert digital signals to analog signals upon transmission. In addition, receiver/transmitter 1010 (e.g., receiver/transmitter circuitry) can divide a single data stream into multiple, parallel data streams, or perform the reciprocal operation. Coupled to receiver/transmitter 1010 can be a multiplexer/demultiplexer 1012 that can facilitate manipulation of signals in time and frequency space. Multiplexer/demultiplexer 1012 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1012 can scramble and spread information (e.g., codes, according to substantially any code known in the art, such as Hadamard-Walsh codes, Baker codes, Kasami codes, polyphase codes, and so forth).

A modulator/demodulator 1014 is also a part of communication platform 1008, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 1016 configured to confer, at least in part, functionality to substantially any electronic component in access equipment and/or software. In particular, processor 1016 can facilitate configuration of access equipment and/or software through, for example, monitor component 1004, antenna component 1006, and one or more components therein. Additionally, access equipment and/or software can include display interface 1018, which can display functions that control functionality of access equipment and/or software or reveal operation conditions thereof. In addition, display interface 1018 can include a screen to convey information to an end user. In an aspect, display interface 1018 can be a liquid crystal display, a plasma panel, a monolithic thin-film based electrochromic display, and so on. Moreover, display interface 1018 can include a component (e.g., speaker) that facilitates communication of aural indicia, which can also be employed in connection with messages that convey operational instructions to an end user. Display interface 1018 can also facilitate data entry (e.g., through a linked keypad or through touch gestures), which can cause access equipment and/or software to receive external commands (e.g., restart operation).

Broadband network interface 1020 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1020 can be internal or external to access equipment and/or software and can utilize display interface 1018 for end-user interaction and status information delivery.

Processor 1016 can be functionally connected to communication platform 1008 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1016 can be functionally connected, through data, system, or an address bus 1022, to display interface 1018 and broadband network interface 1020, to confer, at least in part, functionality to each of such components.

In access equipment and/or software memory 1024 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 1024 also can store data structures, code instructions and program modules, system or device information, code sequences for scrambling, spreading and pilot transmission, access point configuration, and so on. Processor 1016 can be coupled (e.g., through a memory bus), to memory 1024 in order to store and retrieve information used to operate and/or confer functionality to the components, platform, and interface that reside within access equipment and/or software.

In addition, the memory 1024 can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a computer-readable storage medium storing executable instructions that, in response to execution, cause a user equipment (UE) device to perform operations comprising: receiving one or more sounding reference signal (SRS) transmission configuration parameters, including a parameter to communicate an SRS transmission by an SRS carrier switching operation, wherein a component carrier (CC) for the SRS transmission is configured without a physical uplink shared channel (PUSCH) transmission or a physical uplink control channel (PUCCH) transmission; and transmitting the SRS transmission based on: the CC that is for the SRS transmission without the PUSCH transmission or the PUCCH transmission; and at least one of: a first orthogonal frequency-division multiplexing (OFDM) symbol, or a last OFDM symbol, in a subframe colliding with the PUSCH transmission or the PUCCH transmission.

Example 2 includes the subject matter of Example 1, wherein the operations further comprise: configuring or counting one or more resource elements of the first OFDM symbol or the last OFDM symbol of the subframe in a PUSCH mapping and not in the PUSCH transmission.

Example 3 includes the subject matter of any one of Examples 1-2, including or omitting any elements as optional, wherein the operations further comprise: configuring a secondary component carrier (CC) as the CC from among a plurality of CCs to be used without the PUSCH transmission or the PUCCH transmission, based on an SRS transmission configuration.

Example 4 includes the subject matter of any one of Examples 1-3, including or omitting any elements as optional, wherein the one or more SRS transmission configuration parameters comprise at least one of: a starting symbol of the SRS transmission in a dedicated SRS (D-SRS) subframe on a secondary CC of a plurality of CCs and a SRS CC-based switching time of the SRS carrier switching operation in units of OFDM symbols.

Example 5 includes the subject matter of any one of Examples 1-4, including or omitting any elements as optional, wherein the operations further comprise: identifying a period comprising a reduced number of symbols in the D-SRS subframe based on the SRS CC-based switching time and the starting symbol of the SRS transmission on the secondary CC; receiving a physical downlink shared channel (PDSCH) based on the identified period in the D-SRS subframe; and transmitting the SRS transmission on the secondary CC at the starting symbol in the D-SRS based on the one or more SRS transmission configuration parameters.

Example 6 includes the subject matter of any one of Examples 1-5, including or omitting any elements as optional, wherein the operations further comprise: identifying one of a plurality of switching guard period (GP) values from a SRS CC-based switching time, wherein the plurality of switching GP values vary according to whether a primary CC and a secondary CC of a plurality of CCs configured for the SRS carrier switching operation are associated with a same timing advance group (TAG) or different TAGs.

Example 7 includes the subject matter of any one of Examples 1-6, including or omitting any elements as optional, wherein the operations further comprise: determining the SRS transmission configuration of the SRS transmission based on the one or more SRS transmission configuration parameters that include the SRS CC-based switching time in units of OFDM symbols, wherein the receiving the one or more SRS transmission configuration parameters comprises receiving a radio resource control (RRC) signal with the one or more SRS transmission configuration parameters on a primary CC of a plurality of CCs configured for the SRS carrier switching operation.

Example 8 includes the subject matter of any one of Examples 1-7, including or omitting any elements as optional, wherein the operations further comprise: determining a hybrid automatic repeat request (HARQ) timing for at least one of: a primary CC and a secondary CC as serving cells, based on a UL/DL configuration; configuring a part of one or more subframes of a frame structure separate from a HARQ-ACK feedback as D-SRS subframes for the SRS transmission; and communicating using at least one of: the primary CC or the secondary CC by performing the SRS carrier switching operation based on the HARQ timing and a predefined hopping pattern.

Example 9 is a computer-readable storage medium storing executable instructions that, in response to execution, cause one or more processors of an evolved NodeB (eNB) to perform operations comprising: providing one or more parameters based on a sounding reference signal (SRS) transmission configuration comprising a first component carrier (CC) and a second CC configured to enable an SRS transmission according to an SRS carrier switching operation, wherein the second CC is configured to enable the SRS transmission without a physical uplink shared channel (PUSCH) transmission or a physical uplink control channel (PUCCH) transmission; and receiving the SRS transmission based on the SRS carrier switching operation and at least one of: a first orthogonal frequency-division multiplexing (OFDM) symbol or a last OFDM symbol in a subframe colliding with an SRS CC-based switching time of the SRS transmission.

Example 10 includes the subject matter of Example 9, including or omitting any elements as optional, wherein the operations further comprise: configuring the second CC to not be used in the PUSCH transmission or the PUCCH transmission, based on the SRS transmission configuration.

Example 11 includes the subject matter of any one of Examples 9-10, including or omitting any elements as optional, wherein the operations further comprise: configuring or counting one or more resource elements of the first OFDM symbol or the last OFDM symbol of the subframe in a PUSCH mapping and not in the PUSCH transmission.

Example 12 includes the subject matter of any one of Examples 9-11, including or omitting any elements as optional, wherein the operations further comprise: providing a SRS CC-based switching time that indicates one of a plurality of switching guard period (GP) values based on whether the first CC or the second CC is associated with a single timing advance group (TAG) or a plurality of TAGs.

Example 13 includes the subject matter of any one of Examples 9-12, including or omitting any elements as optional, wherein the operations further comprise: providing, on the second CC, a system information block (SIB) 1 or radio resource control (RRC) that indicates a starting symbol of the SRS transmission in a guard period (GP) or an uplink pilot time slot (UpPTS) of a special subframe.

Example 14 includes the subject matter of any one of Examples 9-13, including or omitting any elements as optional, wherein the operations further comprise: transmitting system information conveying the SRS transmission configuration corresponding to a dedicated SRS (D-SRS) subframe as a multicast-broadcast single frequency network (MBSFN) subframe, or as a normal UL subframe, to a first user equipment (UE) on the second CC; and transmitting the system information conveying the SRS transmission configuration corresponding to the D-SRS subframe on the second CC as unicast information to a second UE for the SRS transmission.

Example 15 includes the subject matter of any one of Examples 9-14, including or omitting any elements as optional, wherein the D-SRS subframe on the second CC to the second UE comprises a special subframe that is different from the D-SRS subframe to the first UE.

Example 16 includes the subject matter of any one of Examples 9-15, including or omitting any elements as optional, wherein a starting symbol of the SRS transmission on the second CC is located in a guard period (GP) or an uplink pilot time slot (UpPTS) of the special subframe.

Example 17 includes the subject matter of any one of Examples 9-16, including or omitting any elements as optional, wherein the operations further comprise: transmitting, on the second CC to the second UE, the system information configured to modify a UL subframe configuration to a different UL subframe configuration based on one of a plurality of predefined UL subframe configurations as part of an uplink (UL) grant or a radio resource control (RRC) message, wherein the plurality of predefined UL subframe configurations support different ratios between PUSCH and SRS symbols.

Example 18 is an apparatus employed in a user equipment (UE) device, comprising: one or more processors configured to: receive one or more parameters of a sounding reference signal (SRS) transmission configuration as an uplink (UL)/downlink (DL) configuration of a serving cell; and generate a time division duplex (TDD) operation with component carriers to communicate an SRS transmission based on the one or more parameters of the SRS transmission configuration and reserving at least one component carrier of the component carriers for the SRS transmission from interference from at least one of: a physical uplink shared channel (PUSCH) transmission or a physical uplink control channel (PUCCH) transmission; and a radio frequency interface configured to communicate the SRS transmission.

Example 19 includes the subject matter of Example 18, wherein the one or more processors are further configured to: generate a SRS carrier switching operation based on at least one of: a first orthogonal frequency-division multiplexing (OFDM) symbol or a last OFDM symbol in a subframe colliding with an SRS CC-based switching time of the SRS transmission.

Example 20 includes the subject matter of any one of Examples 18-19, including or omitting any elements as optional, wherein the one or more processors are further configured to: generate a PUSCH mapping in response to the one or more resource elements of the first OFDM symbol or the last OFDM symbol of the subframe colliding with an SRS CC-based switching time of the SRS transmission, and without utilizing the one or more elements for a PUSCH transmission.

Example 21 includes the subject matter of any one of Examples 18-20, including or omitting any elements as optional, wherein the one or more processors are further configured to: configure the at least one CC to not be used in the PUSCH transmission or the PUCCH transmission.

Example 22 includes the subject matter of any one of Examples 18-21, including or omitting any elements as optional, wherein the one or more processors are further configured to: identify a period comprising a reduced number of symbols in a dedicated SRS (D-SRS) subframe based on an SRS CC-based switching time and a starting symbol of the one or more parameters of the SRS transmission configuration; receive a physical downlink shared channel (PDSCH) based on the identified period in the D-SRS subframe; and generate the SRS transmission on the at least one CC at the starting symbol in the D-SRS based on the one or more SRS transmission configuration parameters.

Example 23 includes the subject matter of any one of Examples 18-22, including or omitting any elements as optional, wherein the one or more processors are further configured to: identify one of a plurality of switching guard period (GP) values from a SRS CC-based switching time, wherein the plurality of switching GP values vary according to whether the component carriers are associated with a same timing advance group (TAG) or different TAGs.

Example 24 includes the subject matter of any one of Examples 18-23, including or omitting any elements as optional, wherein the one or more processors are further configured to: receive a radio resource control (RRC) signal with the one or more SRS transmission configuration parameters on a different CC than the at least one CC of the component carriers.

Example 25 includes the subject matter of any one of Examples 18-24, including or omitting any elements as optional, wherein the one or more processors are further configured to: receiving, on the at least one CC, a system information block (SIB) 1 that indicates a starting symbol of the SRS transmission in a guard period (GP) or an uplink pilot time slot (UpPTS) of a special subframe.

Example 26 includes the subject matter of any one of Examples 18-25, including or omitting any elements as optional, wherein the one or more processors are further configured to: receive system information conveying the SRS transmission configuration corresponding to a D-SRS subframe as a multicast-broadcast single frequency network (MBSFN) subframe, or as a normal UL subframe on the at least one CC to generate the SRS transmission; or receive the system information conveying the SRS transmission configuration corresponding to the D-SRS subframe on the at least one CC as unicast information to generate the SRS transmission.

Example 27 includes the subject matter of any one of Examples 18-26, including or omitting any elements as optional, wherein the one or more processors are further configured to: modify a UL subframe configuration to a different UL subframe configuration based on one of a plurality of predefined UL subframe configurations received as part of an uplink (UL) grant or a radio resource control (RRC) message, wherein the plurality of predefined UL subframe configurations support different ratios between PUSCH and SRS symbols.

Example 28 is an apparatus employed in a user equipment (UE) device, comprising: means for receiving one or more sounding reference signal (SRS) transmission configuration parameters, including a parameter to communicate an SRS transmission by an SRS carrier switching operation, wherein a component carrier (CC) for the SRS transmission is configured without a physical uplink shared channel (PUSCH) transmission or a physical uplink control channel (PUCCH) transmission; and means for transmitting the SRS transmission based on: the CC that is for the SRS transmission without the PUSCH transmission or the PUCCH transmission; and at least one of: a first orthogonal frequency-division multiplexing (OFDM) symbol, or a last OFDM symbol, in a subframe colliding with the PUSCH transmission or the PUCCH transmission.

Example 29 includes the subject matter of Example 28, including or omitting any elements as optional, further comprising: means for configuring or counting one or more resource elements of the first OFDM symbol or the last OFDM symbol of the subframe in a PUSCH mapping and not in the PUSCH transmission.

Example 30 includes the subject matter of any one of Examples 28-29, including or omitting any elements as optional, further comprising: means for configuring a secondary component carrier (CC) as the CC from among a plurality of CCs to not be used in the PUSCH transmission or the PUCCH transmission, based on an SRS transmission configuration.

Example 31 includes the subject matter of any one of Examples 28-30, including or omitting any elements as optional, wherein the one or more SRS transmission configuration parameters comprise at least one of: a starting symbol of the SRS transmission in a dedicated SRS (D-SRS) subframe on a secondary CC of a plurality of CCs and the SRS CC-based switching time of the SRS carrier switching operation in units of OFDM symbols.

Example 32 includes the subject matter of any one of Examples 28-31, including or omitting any elements as optional, further comprising: means for identifying a period comprising a reduced number of symbols in the D-SRS subframe based on the SRS CC-based switching time and the starting symbol of the SRS transmission on the secondary CC; means for receiving a physical downlink shared channel (PDSCH) based on the identified period in the D-SRS subframe; and means for transmitting the SRS transmission on the secondary CC at the starting symbol in the D-SRS based on the one or more SRS transmission configuration parameters.

Example 33 includes the subject matter of any one of Examples 28-32, including or omitting any elements as optional, further comprising: means for identifying one of a plurality of switching guard period (GP) values from a SRS CC-based switching time, wherein the plurality of switching GP values vary according to whether a primary CC and a secondary CC of a plurality of CCs configured for the SRS carrier switching operation are associated with a same timing advance group (TAG) or different TAGs.

Example 34 includes the subject matter of any one of Examples 28-33, including or omitting any elements as optional, further comprising: means for determining the SRS transmission configuration of the SRS transmission based on the one or more SRS transmission configuration parameters that include the SRS CC-based switching time in units of OFDM symbols, wherein the receiving the one or more SRS transmission configuration parameters comprises receiving a radio resource control (RRC) signal with the one or more SRS transmission configuration parameters on a primary CC of a plurality of CCs configured for the SRS carrier switching operation.

Example 35 includes the subject matter of any one of Examples 28-34, including or omitting any elements as optional, further comprising: means for determining a hybrid automatic repeat request (HARQ) timing for at least one of: a primary component carrier and a secondary component carrier as serving cells, based on a UL/DL configuration; means for configuring a part of one or more subframes of a frame structure separate from a HARQ-ACK feedback as D-SRS subframes for the SRS transmission; and means for communicating using at least one of: the primary CC or the secondary CC by performing the SRS carrier switching operation based on the HARQ timing and a predefined hopping pattern.

Example 36 is an apparatus employed in an evolved NodeB (eNB), comprising: means for providing one or more parameters based on a sounding reference signal (SRS) transmission configuration comprising a first component carrier (CC) and a second CC configured to enable an SRS transmission according to an SRS carrier switching operation, wherein the second CC is configured to enable the SRS transmission without a physical uplink shared channel (PUSCH) transmission or a physical uplink control channel (PUCCH) transmission; and means for receiving the SRS transmission based on the SRS carrier switching operation and at least one of: a first orthogonal frequency-division multiplexing (OFDM) symbol or a last OFDM symbol in a subframe colliding with an SRS CC-based switching time of the SRS transmission.

Example 37 includes the subject matter of Example 36, including or omitting any elements as optional, further comprising: means for configuring the second CC to not be used in the PUSCH transmission or the PUCCH transmission, based on the SRS transmission configuration.

Example 38 includes the subject matter of any one of Examples 36-37, including or omitting any elements as optional, further comprising: means for configuring or counting one or more resource elements of the first OFDM symbol or the last OFDM symbol of the subframe in a PUSCH mapping and not in the PUSCH transmission.

Example 39 includes the subject matter of any one of Examples 36-38, including or omitting any elements as optional, further comprising: means for providing a SRS CC-based switching time that indicates one of a plurality of switching guard period (GP) values based on whether the first CC or the second CC is associated with a single timing advance group (TAG) or a plurality of TAGs.

Example 40 includes the subject matter of any one of Examples 36-39, including or omitting any elements as optional, further comprising: means for providing, on the second CC, a system information block (SIB) 1 or radio resource control (RRC) that indicates a starting symbol of the SRS transmission in a guard period (GP) or an uplink pilot time slot (UpPTS) of a special subframe.

Example 41 includes the subject matter of any one of Examples 36-40, including or omitting any elements as optional, further comprising: means for transmitting system information conveying the SRS transmission configuration corresponding to a dedicated SRS (D-SRS) subframe as a multicast-broadcast single frequency network (MBSFN) subframe, or as a normal UL subframe, to a first user equipment (UE) on the second CC; and means for transmitting the system information conveying the SRS transmission configuration corresponding to the D-SRS subframe on the second CC as unicast information to a second UE for the SRS transmission.

Example 42 includes the subject matter of any one of Examples 36-41, including or omitting any elements as optional, wherein the D-SRS subframe on the second CC to the second UE comprises a special subframe that is different from the D-SRS subframe to the first UE.

Example 43 includes the subject matter of any one of Examples 36-42, including or omitting any elements as optional, wherein a starting symbol of the SRS transmission on the second CC is located in a guard period (GP) or an uplink pilot time slot (UpPTS) of the special subframe.

Example 44 includes the subject matter of any one of Examples 36-43, including or omitting any elements as optional, further comprising: means for transmitting, on the second CC to the second UE, the system information configured to modify a UL subframe configuration to a different UL subframe configuration based on one of a plurality of predefined UL subframe configurations as part of an uplink (UL) grant or a radio resource control (RRC) message, wherein the plurality of predefined UL subframe configurations support different ratios between PUSCH and SRS symbols.

Example 45 is an apparatus employed in an evolved NodeB (eNB), comprising: one or more processors configured to: provide one or more parameters based on a sounding reference signal (SRS) transmission configuration comprising a first component carrier (CC) and a second CC configured to enable an SRS transmission according to an SRS carrier switching operation, wherein the second CC is configured to enable the SRS transmission without a physical uplink shared channel (PUSCH) transmission or a physical uplink control channel (PUCCH) transmission; and receive the SRS transmission based on the SRS carrier switching operation and at least one of: a first orthogonal frequency-division multiplexing (OFDM) symbol or a last OFDM symbol in a subframe colliding with an SRS CC-based switching time of the SRS transmission. A radio frequency interface is configured to communicate the SRS transmission.

Example 46 includes the subject matter of Example 45, including or omitting any elements as optional, wherein the one or more processors are further configured to: configure the second CC to not be used in the PUSCH transmission or the PUCCH transmission, based on the SRS transmission configuration.

Example 47 includes the subject matter of any one of Examples 45-46, including or omitting any elements as optional, wherein the one or more processors are further configured to: configure or factor one or more resource elements of the first OFDM symbol or the last OFDM symbol of the subframe in a PUSCH mapping and not in the PUSCH transmission.

Example 48 includes the subject matter of any one of Examples 45-47, including or omitting any elements as optional, wherein the one or more processors are further configured to: provide a SRS CC-based switching time that indicates one of a plurality of switching guard period (GP) values based on whether the first CC or the second CC is associated with a single timing advance group (TAG) or a plurality of TAGs.

Example 49 includes the subject matter of any one of Examples 45-48, including or omitting any elements as optional, wherein the one or more processors are further configured to: provide, on the second CC, a system information block (SIB) 1 or radio resource control (RRC) that indicates a starting symbol of the SRS transmission in a guard period (GP) or an uplink pilot time slot (UpPTS) of a special subframe.

Example 50 includes the subject matter of any one of Examples 45-49, including or omitting any elements as optional, wherein the one or more processors are further configured to: transmit system information conveying the SRS transmission configuration corresponding to a dedicated SRS (D-SRS) subframe as a multicast-broadcast single frequency network (MBSFN) subframe, or as a normal UL subframe, to a first user equipment (UE) on the second CC; and transmit the system information conveying the SRS transmission configuration corresponding to the D-SRS subframe on the second CC as unicast information to a second UE for the SRS transmission.

Example 51 includes the subject matter of any one of Examples 45-50, including or omitting any elements as optional, wherein the D-SRS subframe on the second CC to the second UE comprises a special subframe that is different from the D-SRS subframe to the first UE.

Example 52 includes the subject matter of any one of Examples 45-51, including or omitting any elements as optional, wherein a starting symbol of the SRS transmission on the second CC is located in a guard period (GP) or an uplink pilot time slot (UpPTS) of the special subframe.

Example 53 includes the subject matter of any one of Examples 45-50, including or omitting any elements as optional, wherein the one or more processors are further configured to: transmit, on the second CC to the second UE, the system information configured to modify a UL subframe configuration to a different UL subframe configuration based on one of a plurality of predefined UL subframe configurations as part of an uplink (UL) grant or a radio resource control (RRC) message, wherein the plurality of predefined UL subframe configurations support different ratios between PUSCH and SRS symbols.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A baseband processor for a user equipment (UE) configured to:

receive a hybrid automatic repeat request (HARQ) configuration parameter comprising an uplink (UL)/downlink (DL) configuration that indicates a first component carrier (CC) for sounding reference signal (SRS) transmission and a second CC for a physical uplink control channel (PUCCH) transmission, wherein the first CC is without a physical uplink shared channel (PUSCH) transmission and without a physical uplink control channel (PUCCH) transmission; and prioritize the SRS transmission when one or more resource elements in an SRS transmission on the first CC overlap with a PUCCH transmission on the second CC.

2. The baseband processor of claim 1, configured to, in response to the one or more resource elements in the SRS transmission on the first CC overlapping with the PUCCH transmission or the PUSCH transmission on the second CC, configure one or more resource elements of the second CC to be counted in a PUSCH mapping, but not used for transmission of the PUSCH transmission in the second CC.

3. The baseband processor of claim 1, wherein SRS transmission configuration parameters assign a higher priority to the SRS transmission than a HARQ transmission.

4. The baseband processor of claim 1, wherein the one or more resource elements comprise a first orthogonal frequency-division multiplexing (OFDM) symbol or a last OFDM symbol.

5. The baseband processor of claim 1, further configured to configure a periodic SRS transmission or an aperiodic SRS transmission based on a radio resource control (RRC) signaling.

6. The baseband processor of claim 1, further configured to:

determine a HARQ timing for at least one of the first CC or the second CC, based on a received DL reference configuration;

configure a part of one or more subframes as dedicated SRS (D-SRS) subframes for the SRS transmission; and transmit the SRS transmission using the at least one of the first CC or the second CC by performing a SRS carrier switching operation based on the HARQ timing and a predefined hopping pattern.

7. A method for a user equipment (UE), comprising:

receiving a hybrid automatic repeat request (HARQ) configuration parameter comprising an uplink (UL)/downlink (DL) configuration that indicates a first component carrier (CC) for sounding reference signal (SRS) transmission and a second CC for a physical uplink control channel (PUCCH) transmission, wherein the first CC is without a physical uplink shared channel (PUSCH) transmission and without a physical uplink control channel (PUCCH) transmission; and prioritizing the SRS transmission when one or more resource elements in an SRS transmission on the first CC overlap with a PUCCH transmission on the second CC.

8. The method of claim 7, further comprising, in response to the one or more resource elements in the SRS transmission on the first CC overlapping with the PUCCH transmission or the PUSCH transmission on the second CC, configuring one or more resource elements of the second CC to be counted in a PUSCH mapping, but not used for transmission of the PUSCH transmission in the second CC.

9. The method of claim 7, wherein SRS transmission configuration parameters assign a higher priority to the SRS transmission than a HARQ transmission.

10. The method of claim 7, wherein the one or more resource elements comprise a first orthogonal frequency-division multiplexing (OFDM) symbol or a last OFDM symbol.

11. The method of claim 7, further comprising configuring a periodic SRS transmission or an aperiodic SRS transmission based on a radio resource control (RRC) signaling.

12. The method of claim 7, further comprising:

determining a HARQ timing for at least one of the first CC or the second CC, based on a received DL reference configuration;

configuring a part of one or more subframes as dedicated SRS (D-SRS) subframes for the SRS transmission; and transmitting the SRS transmission using the at least one of the first CC or the second CC by performing a SRS carrier switching operation based on the HARQ timing and a predefined hopping pattern.

13. A user equipment (UE), comprising:

means for receiving a hybrid automatic repeat request (HARQ) configuration parameter comprising an uplink (UL)/downlink (DL) configuration that indicates a first component carrier (CC) for sounding reference signal (SRS) transmission and a second CC for a physical uplink control channel (PUCCH) transmission, wherein the first CC is configured without a physical uplink shared channel (PUSCH) transmission and without a physical uplink control channel (PUCCH) transmission; and means for prioritizing the SRS transmission when one or more resource elements in an SRS transmission on the first CC overlap with a PUCCH transmission or a PUSCH transmission on the second CC.

14. The UE of claim 13, further comprising means for, in response to the one or more resource elements in the SRS transmission on the first CC overlapping with the PUCCH transmission or the PUSCH transmission on the second CC, configuring one or more resource elements of the second CC to be counted in a PUSCH mapping, but not used for transmission of the PUSCH transmission in the second CC.

15. The UE of claim 13, wherein SRS transmission configuration parameters assign a higher priority to the SRS transmission than a HARQ transmission.

16. The UE of claim 13, wherein the one or more resource elements comprise a first orthogonal frequency-division multiplexing (OFDM) symbol or a last OFDM symbol.

17. The UE of claim 13, further comprising means for configuring a periodic SRS transmission or an aperiodic SRS transmission based on a radio resource control (RRC) signaling.

18. The UE of claim 13, further comprising:

means for determining a HARQ timing for at least one of the first CC or the second CC, based on a received DL reference configuration;

means for configuring a part of one or more subframes as dedicated SRS (D-SRS) subframes for the SRS transmission; and means for transmitting the SRS transmission using the at least one of the first CC or the second CC by performing a SRS carrier switching operation based on the HARQ timing and a predefined hopping pattern.

* * * * *